(12) United States Patent
Yun et al.

(10) Patent No.: US 10,989,822 B2
(45) Date of Patent: Apr. 27, 2021

(54) WAVELENGTH DISPERSIVE X-RAY SPECTROMETER

(71) Applicant: Sigray, Inc., Concord, CA (US)

(72) Inventors: Wenbing Yun, Walnut Creek, CA (US); Janos Kirz, Berkeley, CA (US); Benjamin Donald Stripe, Walnut Creek, CA (US)

(73) Assignee: Sigray, Inc., Concord, CA (US)

(*) Notice: Subject to any disclaimer, the term of this patent is extended or adjusted under 35 U.S.C. 154(b) by 0 days.

(21) Appl. No.: 16/427,148

(22) Filed: May 30, 2019

(65) Prior Publication Data
US 2019/0369271 A1    Dec. 5, 2019

Related U.S. Application Data

(60) Provisional application No. 62/680,451, filed on Jun. 4, 2018, provisional application No. 62/680,795, filed on Jun. 5, 2018.

(51) Int. Cl.
*G01T 1/36* (2006.01)

(52) U.S. Cl.
CPC ...................... *G01T 1/36* (2013.01)

(58) Field of Classification Search
CPC .......................................................... G01T 1/36
See application file for complete search history.

(56) References Cited

U.S. PATENT DOCUMENTS 1,203,495 A   10/1916 Coolidge
1,211,092 A   1/1917 Coolidge
(Continued)

FOREIGN PATENT DOCUMENTS

CN   101257851   9/2008
CN   101532969   9/2009
(Continued)

OTHER PUBLICATIONS

Behling, "Medical X-ray sources Now and for the Future," Nucl. Inst. and Methods in Physics Research A 873, pp. 43-50 (2017).
(Continued)

*Primary Examiner* — Christine S. Kim
(74) *Attorney, Agent, or Firm* — Knobbe, Martens, Olson & Bear, LLP

(57) ABSTRACT

An x-ray spectrometer includes at least one x-ray optic configured to receive x-rays having an incident intensity distribution as a function of x-ray energy and at least one x-ray detector configured to receive x-rays from the at least one x-ray optic and to record a spatial distribution of the x-rays from the at least one x-ray optic. The at least one x-ray optic includes at least one substrate having at least one surface extending at least partially around and along a longitudinal axis. A distance between the at least one surface and the longitudinal axis in at least one cross-sectional plane parallel to the longitudinal axis varies as a function of position along the longitudinal axis. The at least one x-ray optic further includes at least one mosaic crystal structure and/or a plurality of layers on or over at least a portion of the at least one surface. The plurality of layers has a first plurality of first layers comprising a first material and a second plurality of second layers comprising a second material. The first layers and the second layers alternate with one another in a direction perpendicular to the at least one surface.

28 Claims, 10 Drawing Sheets

(56) References Cited

U.S. PATENT DOCUMENTS

| | | |
|---|---|---|
| 1,215,116 A | 2/1917 | Coolidge |
| 1,328,495 A | 1/1920 | Coolidge |
| 1,355,126 A | 10/1920 | Coolidge |
| 1,790,073 A | 1/1931 | Pohl |
| 1,917,099 A | 7/1933 | Coolidge |
| 1,946,312 A | 2/1934 | Coolidge |
| 2,926,270 A | 2/1960 | Zunick |
| 3,795,832 A | 3/1974 | Holland |
| 4,165,472 A | 8/1979 | Wittry |
| 4,192,994 A | 3/1980 | Kastner |
| 4,227,112 A | 10/1980 | Waugh et al. |
| 4,266,138 A | 5/1981 | Nelson et al. |
| 4,426,718 A | 1/1984 | Hayashi |
| 4,523,327 A | 6/1985 | Eversole |
| 4,573,186 A | 2/1986 | Reinhold |
| 4,642,811 A | 2/1987 | Georgopoulos |
| 4,727,000 A * | 2/1988 | Ovshinsky ............ B82Y 10/00 204/192.27 |
| 4,798,446 A | 1/1989 | Hettrick |
| 4,807,268 A | 2/1989 | Wittrey |
| 4,940,319 A | 7/1990 | Ueda et al. |
| 4,945,552 A * | 7/1990 | Ueda ..................... G01T 1/36 378/156 |
| 4,951,304 A | 8/1990 | Piestrup et al. |
| 4,972,449 A | 11/1990 | Upadhya et al. |
| 5,001,737 A | 3/1991 | Lewis et al. |
| 5,008,918 A | 4/1991 | Lee et al. |
| 5,119,408 A | 6/1992 | Little |
| 5,132,997 A | 7/1992 | Kojima |
| 5,148,462 A | 9/1992 | Spitsyn et al. |
| 5,173,928 A | 12/1992 | Momose et al. |
| 5,204,887 A | 4/1993 | Hayashida et al. |
| 5,249,216 A | 9/1993 | Ohsugi et al. |
| 5,276,724 A | 1/1994 | Kumasaka et al. |
| 5,371,774 A | 12/1994 | Cerrina |
| 5,452,142 A | 9/1995 | Hall |
| 5,461,657 A | 10/1995 | Hayashida |
| 5,513,237 A | 4/1996 | Nobuta et al. |
| 5,602,899 A | 2/1997 | Larson |
| 5,604,782 A | 2/1997 | Cash, Jr. |
| 5,629,969 A | 5/1997 | Koshishiba |
| 5,657,365 A | 8/1997 | Yamamoto et al. |
| 5,682,415 A | 10/1997 | O'Hara |
| 5,715,291 A | 2/1998 | Momose |
| 5,729,583 A | 3/1998 | Tang et al. |
| 5,737,387 A | 4/1998 | Smither |
| 5,768,339 A | 6/1998 | O'Hara |
| 5,772,903 A | 6/1998 | Hirsch |
| 5,778,039 A | 7/1998 | Hossain |
| 5,799,056 A * | 8/1998 | Gutman ................ B82Y 10/00 378/82 |
| 5,812,629 A | 9/1998 | Clauser |
| 5,825,848 A | 10/1998 | Virshup et al. |
| 5,832,052 A | 11/1998 | Hirose et al. |
| 5,857,008 A | 1/1999 | Reinhold |
| 5,878,110 A | 3/1999 | Yamamoto et al. |
| 5,881,126 A | 3/1999 | Momose |
| 5,912,940 A | 6/1999 | O'Hara |
| 5,930,325 A | 7/1999 | Momose |
| 6,108,397 A | 8/2000 | Cash, Jr. |
| 6,108,398 A | 8/2000 | Mazor et al. |
| 6,118,853 A | 9/2000 | Hansen et al. |
| 6,125,167 A | 9/2000 | Morgan |
| 6,181,773 B1 | 1/2001 | Lee et al. |
| 6,195,410 B1 * | 2/2001 | Cash, Jr. ............. G01N 23/041 378/43 |
| 6,226,347 B1 * | 5/2001 | Golenhofen ......... G01N 23/221 378/44 |
| 6,278,764 B1 | 8/2001 | Barbee, Jr. et al. |
| 6,307,916 B1 | 10/2001 | Rogers et al. |
| 6,359,964 B1 | 3/2002 | Kogan |
| 6,377,660 B1 | 4/2002 | Ukita et al. |
| 6,381,303 B1 | 4/2002 | Vu et al. |
| 6,389,100 B1 | 5/2002 | Verman et al. |
| 6,430,254 B2 | 8/2002 | Wilkins |
| 6,430,260 B1 | 8/2002 | Snyder |
| 6,442,231 B1 * | 8/2002 | O'Hara ............ G01N 23/20025 378/145 |
| 6,456,688 B1 | 9/2002 | Taguchi et al. |
| 6,463,123 B1 | 10/2002 | Korenev |
| 6,487,272 B1 | 11/2002 | Kutsuzawa |
| 6,504,901 B1 * | 1/2003 | Loxley ..................... G21K 1/06 378/145 |
| 6,504,902 B2 | 1/2003 | Iwasaki et al. |
| 6,507,388 B2 | 1/2003 | Burghoorn |
| 6,553,096 B1 | 4/2003 | Zhou et al. |
| 6,560,313 B1 | 5/2003 | Harding et al. |
| 6,560,315 B1 | 5/2003 | Price et al. |
| 6,707,883 B1 | 3/2004 | Tiearney et al. |
| 6,711,234 B1 | 3/2004 | Loxley et al. |
| 6,763,086 B2 | 7/2004 | Platonov |
| 6,811,612 B2 | 11/2004 | Gruen et al. |
| 6,815,363 B2 | 11/2004 | Yun et al. |
| 6,829,327 B1 | 12/2004 | Chen |
| 6,847,699 B2 | 1/2005 | Rigali et al. |
| 6,850,598 B1 | 2/2005 | Fryda et al. |
| 6,870,172 B1 | 3/2005 | Mankos et al. |
| 6,885,503 B2 | 4/2005 | Yun et al. |
| 6,891,627 B1 | 5/2005 | Levy et al. |
| 6,914,723 B2 | 7/2005 | Yun et al. |
| 6,917,472 B1 | 7/2005 | Yun et al. |
| 6,934,359 B2 * | 8/2005 | Chen ..................... B82Y 10/00 378/45 |
| 6,947,522 B2 | 9/2005 | Wilson et al. |
| 6,975,703 B2 | 12/2005 | Wilson et al. |
| 7,003,077 B2 | 2/2006 | Jen et al. |
| 7,006,596 B1 | 2/2006 | Janik |
| 7,015,467 B2 | 3/2006 | Maldonado et al. |
| 7,023,950 B1 | 4/2006 | Annis |
| 7,023,955 B2 | 4/2006 | Chen et al. |
| 7,057,187 B1 | 6/2006 | Yun et al. |
| 7,076,026 B2 | 6/2006 | Verman et al. |
| 7,079,625 B2 | 7/2006 | Lenz |
| 7,095,822 B1 | 8/2006 | Yun |
| 7,103,138 B2 | 9/2006 | Pelc et al. |
| 7,110,503 B1 | 9/2006 | Kumakhov |
| 7,119,953 B2 | 10/2006 | Yun et al. |
| 7,120,228 B2 | 10/2006 | Yokhin et al. |
| 7,130,375 B1 | 10/2006 | Yun et al. |
| 7,149,283 B2 | 12/2006 | Hoheisel et al. |
| 7,170,969 B1 | 1/2007 | Yun et al. |
| 7,180,979 B2 | 2/2007 | Momose |
| 7,180,981 B2 | 2/2007 | Wang |
| 7,183,547 B2 | 2/2007 | Yun et al. |
| 7,215,736 B1 | 5/2007 | Wang et al. |
| 7,215,741 B2 | 5/2007 | Ukita et al. |
| 7,218,700 B2 | 5/2007 | Huber et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,264,397 B2 | 9/2007 | Ritter |
| 7,268,945 B2 | 9/2007 | Yun et al. |
| 7,286,640 B2 | 10/2007 | Yun et al. |
| 7,297,959 B2 | 11/2007 | Yun et al. |
| 7,298,826 B2 | 11/2007 | Inazuru |
| 7,330,533 B2 | 2/2008 | Sampayon |
| 7,346,148 B2 | 3/2008 | Ukita |
| 7,346,204 B2 | 3/2008 | Ito |
| 7,349,525 B2 | 3/2008 | Morton |
| 7,359,487 B1 | 4/2008 | Newcome |
| 7,365,909 B2 | 4/2008 | Yun et al. |
| 7,365,918 B1 | 4/2008 | Yun et al. |
| 7,382,864 B2 | 6/2008 | Hebert et al. |
| 7,388,942 B2 | 6/2008 | Wang et al. |
| 7,394,890 B1 | 7/2008 | Wang et al. |
| 7,400,704 B1 | 7/2008 | Yun et al. |
| 7,406,151 B1 | 7/2008 | Yun |
| 7,412,024 B1 | 8/2008 | Yun et al. |
| 7,412,030 B1 | 8/2008 | O'Hara |
| 7,412,131 B2 | 8/2008 | Lee et al. |
| 7,414,787 B2 | 8/2008 | Yun et al. |
| 7,433,444 B2 | 10/2008 | Baumann |
| 7,440,542 B2 | 10/2008 | Baumann |

(56) References Cited

U.S. PATENT DOCUMENTS

| | | | |
|---|---|---|---|
| 7,443,953 B1 | 10/2008 | Yun et al. |
| 7,443,958 B2 | 10/2008 | Harding |
| 7,453,981 B2 | 11/2008 | Baumann |
| 7,463,712 B2 | 12/2008 | Zhu et al. |
| 7,474,735 B2 | 1/2009 | Spahn |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,522,698 B2 | 4/2009 | Popescu |
| 7,522,707 B2 | 4/2009 | Steinlage et al. |
| 7,522,708 B2 | 4/2009 | Heismann |
| 7,529,343 B2 | 5/2009 | Safai et al. |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,583,789 B1 | 9/2009 | Macdonald et al. |
| 7,601,399 B2 | 10/2009 | Barnola et al. |
| 7,605,371 B2 | 10/2009 | Yasui et al. |
| 7,639,786 B2 | 12/2009 | Baumann |
| 7,646,843 B2 | 1/2010 | Popescu et al. |
| 7,653,177 B2 | 1/2010 | Baumann et al. |
| 7,672,433 B2 | 3/2010 | Zhong et al. |
| 7,680,243 B2 | 3/2010 | Yokhin et al. |
| 7,738,629 B2 | 6/2010 | Chen |
| 7,787,588 B1 | 8/2010 | Yun et al. |
| 7,796,725 B1 | 9/2010 | Yun et al. |
| 7,796,726 B1 | 9/2010 | Gendreau et al. |
| 7,800,072 B2 | 9/2010 | Yun et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 * | 12/2010 | Platonov ............... B82Y 10/00 |
| | | | 378/44 |
| 7,864,426 B2 | 1/2011 | Yun et al. |
| 7,864,922 B2 | 1/2011 | Kawabe |
| 7,873,146 B2 | 1/2011 | Okunuki et al. |
| 7,876,883 B2 | 1/2011 | O'Hara |
| 7,889,838 B2 | 2/2011 | David et al. |
| 7,889,844 B2 | 2/2011 | Okunuki et al. |
| 7,899,154 B2 | 3/2011 | Chen et al. |
| 7,902,528 B2 | 3/2011 | Hara et al. |
| 7,914,693 B2 | 3/2011 | Jeong et al. |
| 7,920,673 B2 | 4/2011 | Lanza et al. |
| 7,920,676 B2 | 4/2011 | Yun et al. |
| 7,924,973 B2 | 4/2011 | Kottler et al. |
| 7,929,667 B1 | 4/2011 | Zhuang et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 7,991,120 B2 | 8/2011 | Okunuki et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,036,341 B2 | 11/2011 | Lee |
| 8,058,621 B2 | 11/2011 | Kommareddy |
| 8,068,579 B1 | 11/2011 | Yun et al. |
| 8,073,099 B2 | 12/2011 | Niu et al. |
| 8,094,784 B2 | 1/2012 | Morton |
| 8,139,711 B2 | 3/2012 | Takahashi |
| 8,139,716 B2 | 3/2012 | Okunuki et al. |
| 8,165,270 B2 | 4/2012 | David et al. |
| 8,184,771 B2 | 5/2012 | Murakoshi |
| 8,208,602 B2 | 6/2012 | Lee |
| 8,208,603 B2 | 6/2012 | Sato |
| 8,233,587 B2 | 7/2012 | Sato |
| 8,243,879 B2 | 8/2012 | Itoh et al. |
| 8,243,884 B2 | 8/2012 | Rödhammer et al. |
| 8,249,220 B2 | 8/2012 | Verman et al. |
| 8,280,000 B2 | 10/2012 | Takahashi |
| 8,306,183 B2 | 11/2012 | Koehler |
| 8,306,184 B2 | 11/2012 | Chang et al. |
| 8,331,534 B2 | 12/2012 | Silver |
| 8,351,569 B2 | 1/2013 | Baker |
| 8,351,570 B2 | 1/2013 | Nakamura |
| 8,353,628 B1 | 1/2013 | Yun et al. |
| 8,357,894 B2 | 1/2013 | Toth et al. |
| 8,360,640 B2 | 1/2013 | Reinhold |
| 8,374,309 B2 | 2/2013 | Donath |
| 8,406,378 B2 | 3/2013 | Wang et al. |
| 8,416,920 B2 | 4/2013 | Okumura et al. |
| 8,422,633 B2 | 4/2013 | Lantz et al. |
| 8,423,127 B2 | 4/2013 | Mahmood et al. |
| 8,451,975 B2 | 5/2013 | Tada |
| 8,422,637 B2 | 6/2013 | Okunuki et al. |
| 8,488,743 B2 * | 7/2013 | Verman ................. G21K 1/067 |
| | | | 378/145 |
| 8,509,386 B2 | 8/2013 | Lee et al. |
| 8,520,803 B2 | 8/2013 | Behling |
| 8,526,575 B1 | 9/2013 | Yun et al. |
| 8,532,257 B2 | 9/2013 | Mukaide et al. |
| 8,553,843 B2 | 10/2013 | Drory |
| 8,559,594 B2 | 10/2013 | Ouchi |
| 8,559,597 B2 | 10/2013 | Chen et al. |
| 8,565,371 B2 | 10/2013 | Bredno |
| 8,576,983 B2 | 11/2013 | Baeumer |
| 8,588,372 B2 | 11/2013 | Zou et al. |
| 8,591,108 B2 | 11/2013 | Tada |
| 8,602,648 B1 | 12/2013 | Jacobsen et al. |
| 8,632,247 B2 | 1/2014 | Ishii |
| 8,644,451 B2 | 2/2014 | Aoki et al. |
| 8,666,024 B2 | 3/2014 | Okunuki et al. |
| 8,666,025 B2 | 3/2014 | Klausz |
| 8,699,667 B2 | 4/2014 | Steinlage et al. |
| 8,735,844 B1 | 5/2014 | Khaykovich et al. |
| 8,737,565 B1 | 5/2014 | Lyon et al. |
| 8,744,048 B2 | 6/2014 | Lee et al. |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,831,174 B2 | 9/2014 | Kohara |
| 8,831,175 B2 | 9/2014 | Silver et al. |
| 8,831,179 B2 | 9/2014 | Adler et al. |
| 8,837,680 B2 | 9/2014 | Tsujii |
| 8,855,265 B2 | 10/2014 | Engel |
| 8,859,977 B2 | 10/2014 | Kondoh |
| 8,861,682 B2 | 10/2014 | Okunuki et al. |
| 8,903,042 B2 | 12/2014 | Ishii |
| 8,908,824 B2 | 12/2014 | Kondoh |
| 8,972,191 B2 | 3/2015 | Stampanoni et al. |
| 8,989,351 B2 | 3/2015 | Vogtmeier et al. |
| 8,989,474 B2 | 3/2015 | Kido et al. |
| 8,995,622 B2 | 3/2015 | Adler et al. |
| 9,001,967 B2 | 4/2015 | Baturin |
| 9,001,968 B2 | 4/2015 | Kugland et al. |
| 9,007,562 B2 | 4/2015 | Marconi et al. |
| 9,008,278 B2 | 4/2015 | Lee et al. |
| 9,016,943 B2 | 4/2015 | Jacobsen et al. |
| 9,020,101 B2 | 4/2015 | Omote et al. |
| 9,025,725 B2 | 5/2015 | Kiyohara et al. |
| 9,029,795 B2 | 5/2015 | Sando |
| 9,031,201 B2 | 5/2015 | Sato |
| 9,036,773 B2 | 5/2015 | David et al. |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,230,703 B2 | 1/2016 | Mohr et al. |
| 9,234,856 B2 | 1/2016 | Mukaide |
| 9,251,995 B2 | 2/2016 | Ogura |
| 9,257,254 B2 | 2/2016 | Ogura et al. |
| 9,263,225 B2 | 2/2016 | Morton |
| 9,280,056 B2 | 3/2016 | Clube et al. |
| 9,281,158 B2 | 3/2016 | Ogura |
| 9,291,578 B2 | 3/2016 | Adler |
| 9,329,141 B2 | 5/2016 | Stutman |
| 9,336,917 B2 | 5/2016 | Ozawa et al. |

(56) References Cited

U.S. PATENT DOCUMENTS

| | | |
|---|---|---|
| 9,357,975 B2 | 6/2016 | Baturin |
| 9,362,081 B2 | 6/2016 | Bleuet |
| 9,370,084 B2 | 6/2016 | Sprong et al. |
| 9,390,881 B2 | 7/2016 | Yun et al. |
| 9,412,552 B2 | 8/2016 | Aoki et al. |
| 9,430,832 B2 | 8/2016 | Koehler et al. |
| 9,439,613 B2 | 9/2016 | Stutman |
| 9,445,775 B2 | 9/2016 | Das |
| 9,448,190 B2 | 9/2016 | Yun et al. |
| 9,449,780 B2 | 9/2016 | Chen |
| 9,449,781 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,502,204 B2 | 11/2016 | Ikarashi |
| 9,520,260 B2 | 12/2016 | Hesselink et al. |
| 9,524,846 B2 | 12/2016 | Sato et al. |
| 9,532,760 B2 | 1/2017 | Anton et al. |
| 9,543,109 B2 | 1/2017 | Yun et al. |
| 9,557,280 B2 | 1/2017 | Pfeiffer et al. |
| 9,564,284 B2 | 2/2017 | Gerzoskovitz |
| 9,570,264 B2 | 2/2017 | Ogura et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,595,415 B2 | 3/2017 | Ogura |
| 9,632,040 B2 | 4/2017 | Stutman |
| 9,658,174 B2 * | 5/2017 | Omote ................. G01N 23/207 |
| 9,700,267 B2 | 7/2017 | Baturin et al. |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,770,215 B2 | 9/2017 | Souchay et al. |
| 9,823,203 B2 | 11/2017 | Yun et al. |
| 9,826,949 B2 | 11/2017 | Ning |
| 9,837,178 B2 | 12/2017 | Nagai |
| 9,842,414 B2 | 12/2017 | Koehler |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 9,934,930 B2 | 4/2018 | Parker et al. |
| 9,939,392 B2 | 4/2018 | Wen |
| 9,970,119 B2 | 5/2018 | Yokoyama |
| 10,014,148 B2 | 7/2018 | Tang et al. |
| 10,020,158 B2 | 7/2018 | Yamada |
| 10,028,716 B2 | 7/2018 | Rossl |
| 10,045,753 B2 | 8/2018 | Teshima |
| 10,068,740 B2 | 9/2018 | Gupta |
| 10,074,451 B2 | 9/2018 | Kottler et al. |
| 10,076,297 B2 | 9/2018 | Bauer |
| 10,085,701 B2 | 10/2018 | Hoshino |
| 10,105,112 B2 | 10/2018 | Utsumi |
| 10,115,557 B2 | 10/2018 | Ishii |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,176,297 B2 | 1/2019 | Zerhusen et al. |
| 10,182,194 B2 | 1/2019 | Karim et al. |
| 10,217,596 B2 | 2/2019 | Liang et al. |
| 10,231,687 B2 | 3/2019 | Kahn et al. |
| 10,247,683 B2 | 4/2019 | Yun et al. |
| 10,256,001 B2 | 4/2019 | Yokoyama |
| 10,264,659 B1 | 4/2019 | Miller et al. |
| 10,267,752 B2 | 4/2019 | Zhang et al. |
| 10,267,753 B2 | 4/2019 | Zhang et al. |
| 10,269,528 B2 | 4/2019 | Yun et al. |
| 10,295,485 B2 | 5/2019 | Yun et al. |
| 10,295,486 B2 | 5/2019 | Yun et al. |
| 10,297,359 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,393,683 B2 | 8/2019 | Hegeman et al. |
| 10,401,309 B2 | 9/2019 | Yun et al. |
| 10,416,099 B2 | 9/2019 | Yun et al. |
| 10,429,325 B2 | 10/2019 | Ito et al. |
| 10,466,185 B2 | 11/2019 | Yun et al. |
| 10,485,492 B2 | 11/2019 | Koehler et al. |
| 10,568,588 B2 | 2/2020 | Koehler et al. |
| 10,653,376 B2 | 5/2020 | Yun et al. |
| 10,697,902 B2 | 6/2020 | Sharma et al. |
| 10,743,396 B1 | 8/2020 | Kawase |
| 10,841,515 B1 | 11/2020 | Tsujino |
| 2001/0006413 A1 | 7/2001 | Burghoorn |
| 2002/0080916 A1 * | 6/2002 | Jiang ..................... B82Y 10/00 378/84 |
| 2002/0085676 A1 | 7/2002 | Snyder |
| 2003/0142790 A1 | 1/2003 | Zhou et al. |
| 2003/0054133 A1 | 3/2003 | Wadley et al. |
| 2003/0112923 A1 * | 6/2003 | Lange ..................... G21K 1/06 378/147 |
| 2003/0142781 A1 | 7/2003 | Kawahara |
| 2003/0223536 A1 | 12/2003 | Yun et al. |
| 2004/0047446 A1 | 3/2004 | Platonov |
| 2004/0076260 A1 | 4/2004 | Charles, Jr. |
| 2004/0120463 A1 | 6/2004 | Wilson et al. |
| 2004/0140432 A1 | 7/2004 | Maldonado et al. |
| 2005/0025281 A1 | 2/2005 | Verman et al. |
| 2005/0074094 A1 | 4/2005 | Jen et al. |
| 2005/0123097 A1 | 6/2005 | Wang |
| 2005/0163284 A1 | 7/2005 | Inazuru |
| 2005/0201520 A1 | 9/2005 | Smith et al. |
| 2005/0282300 A1 | 12/2005 | Yun et al. |
| 2006/0045234 A1 | 3/2006 | Pelc |
| 2006/0062350 A1 | 3/2006 | Yokhin |
| 2006/0182322 A1 | 8/2006 | Bernhardt et al. |
| 2006/0233309 A1 | 10/2006 | Kutzner et al. |
| 2006/0239405 A1 * | 10/2006 | Verman ................. B82Y 10/00 378/85 |
| 2007/0030959 A1 | 2/2007 | Ritter |
| 2007/0071174 A1 | 3/2007 | Hebert et al. |
| 2007/0108387 A1 | 5/2007 | Yun et al. |
| 2007/0110217 A1 | 5/2007 | Ukita |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2008/0084966 A1 | 4/2008 | Aoki et al. |
| 2008/0089484 A1 | 4/2008 | Reinhold |
| 2008/0094694 A1 | 4/2008 | Yun et al. |
| 2008/0099935 A1 | 5/2008 | Egle |
| 2008/0116398 A1 | 5/2008 | Hara |
| 2008/0117511 A1 | 5/2008 | Chen |
| 2008/0159475 A1 | 7/2008 | Mazor et al. |
| 2008/0159707 A1 | 7/2008 | Lee et al. |
| 2008/0165355 A1 | 7/2008 | Yasui et al. |
| 2008/0170662 A1 | 7/2008 | Reinhold |
| 2008/0170668 A1 | 7/2008 | Kruit et al. |
| 2008/0181363 A1 | 7/2008 | Fenter et al. |
| 2008/0240344 A1 | 10/2008 | Reinhold |
| 2008/0273662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2009/0316860 A1 | 12/2009 | Okunuki et al. |
| 2010/0012845 A1 | 1/2010 | Baeumer et al. |
| 2010/0027739 A1 | 2/2010 | Lantz et al. |
| 2010/0040202 A1 | 2/2010 | Lee |
| 2010/0046702 A1 | 2/2010 | Chen et al. |
| 2010/0061508 A1 | 3/2010 | Takahashi |
| 2010/0091947 A1 | 4/2010 | Niu |
| 2010/0141151 A1 | 6/2010 | Reinhold |
| 2010/0246765 A1 | 9/2010 | Murakoshi |
| 2010/0260315 A1 | 10/2010 | Sato et al. |
| 2010/0272239 A1 | 10/2010 | Lantz et al. |
| 2010/0284513 A1 | 11/2010 | Kawabe |
| 2011/0026680 A1 | 2/2011 | Sato |
| 2011/0038455 A1 | 2/2011 | Silver et al. |

(56) References Cited

U.S. PATENT DOCUMENTS

| | | |
|---|---|---|
| 2011/0058655 A1 | 3/2011 | Okumura et al. |
| 2011/0064191 A1 | 3/2011 | Toth et al. |
| 2011/0064202 A1 | 3/2011 | Thran et al. |
| 2011/0085644 A1 | 4/2011 | Verman |
| 2011/0135066 A1 | 6/2011 | Behling |
| 2011/0142204 A1 | 6/2011 | Zou et al. |
| 2011/0235781 A1 | 9/2011 | Aoki et al. |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0057669 A1 | 3/2012 | Vogtmeier et al. |
| 2012/0163547 A1 | 6/2012 | Lee et al. |
| 2012/0163554 A1 | 6/2012 | Tada |
| 2012/0224670 A1 | 9/2012 | Kiyohara et al. |
| 2012/0228475 A1 | 9/2012 | Pang et al. |
| 2012/0269323 A1 | 10/2012 | Adler et al. |
| 2012/0269324 A1 | 10/2012 | Adler |
| 2012/0269325 A1 | 10/2012 | Adler et al. |
| 2012/0269326 A1 | 10/2012 | Adler et al. |
| 2012/0294420 A1 | 11/2012 | Nagai |
| 2013/0011040 A1 | 1/2013 | Kido et al. |
| 2013/0032727 A1 | 2/2013 | Kondoe |
| 2013/0039460 A1 | 2/2013 | Levy |
| 2013/0108012 A1 | 5/2013 | Sato |
| 2013/0108022 A1 | 5/2013 | Kugland et al. |
| 2013/0195246 A1 | 8/2013 | Tamura et al. |
| 2013/0223594 A1 | 8/2013 | Sprong et al. |
| 2013/0235976 A1 | 9/2013 | Jeong et al. |
| 2013/0251100 A1 | 9/2013 | Sasaki et al. |
| 2013/0259207 A1 | 10/2013 | Omote et al. |
| 2013/0279651 A1 | 10/2013 | Yokoyama |
| 2013/0308112 A1 | 11/2013 | Clube et al. |
| 2013/0308754 A1 | 11/2013 | Yamazaki et al. |
| 2014/0023973 A1 | 1/2014 | Marconi et al. |
| 2014/0029729 A1 | 1/2014 | Kucharczyk |
| 2014/0037052 A1 | 2/2014 | Adler |
| 2014/0064445 A1 | 3/2014 | Adler |
| 2014/0072104 A1 | 3/2014 | Jacobsen et al. |
| 2014/0079188 A1 | 3/2014 | Hesselink et al. |
| 2014/0105353 A1 | 4/2014 | Pfeiffer et al. |
| 2014/0105363 A1 | 4/2014 | Chen et al. |
| 2014/0146945 A1 | 5/2014 | Fredenberg et al. |
| 2014/0153692 A1 | 6/2014 | Larkin et al. |
| 2014/0177800 A1 | 6/2014 | Sato et al. |
| 2014/0185778 A1 | 7/2014 | Lee et al. |
| 2014/0205057 A1 | 7/2014 | Koehler et al. |
| 2014/0211919 A1 | 7/2014 | Ogura et al. |
| 2014/0226785 A1 | 8/2014 | Stutman et al. |
| 2014/0241493 A1 | 8/2014 | Yokoyama |
| 2014/0270060 A1 | 9/2014 | Date et al. |
| 2014/0369469 A1 | 12/2014 | Ogura et al. |
| 2014/0369471 A1 | 12/2014 | Ogura et al. |
| 2015/0030126 A1 | 1/2015 | Radicke |
| 2015/0030127 A1 | 1/2015 | Aoki et al. |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0092924 A1 | 4/2015 | Yun et al. |
| 2015/0110252 A1 | 4/2015 | Yun et al. |
| 2015/0117599 A1 | 4/2015 | Yun et al. |
| 2015/0194287 A1 | 7/2015 | Yun et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0323478 A1 | 11/2015 | Stutman |
| 2015/0357069 A1 | 12/2015 | Yun et al. |
| 2016/0064175 A1 | 3/2016 | Yun et al. |
| 2016/0066870 A1 | 3/2016 | Yun et al. |
| 2016/0106387 A1 | 4/2016 | Kahn |
| 2016/0178540 A1 | 6/2016 | Yun et al. |
| 2016/0178541 A1 | 6/2016 | Hwang et al. |
| 2016/0206259 A1 | 7/2016 | Auclair et al. |
| 2016/0268094 A1 | 9/2016 | Yun et al. |
| 2016/0320320 A1 | 11/2016 | Yun et al. |
| 2016/0351370 A1 | 12/2016 | Yun et al. |
| 2017/0018392 A1 | 1/2017 | Cheng |
| 2017/0047191 A1 | 2/2017 | Yun et al. |
| 2017/0052128 A1 | 2/2017 | Yun et al. |
| 2017/0074809 A1* | 3/2017 | Ito ............... G01N 23/201 |
| 2017/0162288 A1 | 6/2017 | Yun et al. |
| 2017/0162359 A1 | 6/2017 | Tang et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0144901 A1 | 5/2018 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0344276 A1 | 12/2018 | DeFreitas et al. |
| 2018/0348151 A1 | 12/2018 | Kasper et al. |
| 2018/0356355 A1 | 12/2018 | Momose et al. |
| 2019/0017942 A1 | 1/2019 | Filevich |
| 2019/0017946 A1 | 1/2019 | Wack et al. |
| 2019/0018824 A1 | 1/2019 | Zarkadas |
| 2019/0019647 A1 | 1/2019 | Lee et al. |
| 2019/0027265 A1 | 1/2019 | Dey et al. |
| 2019/0043689 A1 | 2/2019 | Camus |
| 2019/0057832 A1 | 2/2019 | Durst et al. |
| 2019/0064084 A1 | 2/2019 | Ullom et al. |
| 2019/0086342 A1 | 3/2019 | Pois et al. |
| 2019/0088439 A1 | 3/2019 | Honda |
| 2019/0113466 A1 | 4/2019 | Karim et al. |
| 2019/0115184 A1 | 4/2019 | Zalubovsky |
| 2019/0131103 A1 | 5/2019 | Tuohimaa |
| 2019/0132936 A1 | 5/2019 | Steck et al. |
| 2019/0154892 A1 | 5/2019 | Moldovan |
| 2019/0172681 A1 | 6/2019 | Owen et al. |
| 2019/0189385 A1 | 6/2019 | Liang et al. |
| 2019/0204246 A1 | 7/2019 | Hegeman et al. |
| 2019/0204757 A1 | 7/2019 | Brussard et al. |
| 2019/0206652 A1 | 7/2019 | Akinwande et al. |
| 2019/0212281 A1* | 7/2019 | Shchegrov ............... H05G 1/30 |
| 2019/0214216 A1 | 7/2019 | Jeong et al. |
| 2019/0216416 A1 | 7/2019 | Koehler et al. |
| 2019/0219713 A1 | 7/2019 | Booker et al. |
| 2019/0261935 A1 | 8/2019 | Kitamura |
| 2019/0272929 A1 | 9/2019 | Omote et al. |
| 2019/0304735 A1 | 10/2019 | Safai et al. |
| 2019/0311874 A1 | 10/2019 | Tuohimma et al. |
| 2019/0317027 A1 | 10/2019 | Tsuboi et al. |
| 2019/0331616 A1 | 10/2019 | Schaff et al. |
| 2019/0341219 A1 | 11/2019 | Zhang et al. |
| 2019/0341220 A1 | 11/2019 | Parker et al. |
| 2019/0353802 A1 | 11/2019 | Steinhauser et al. |
| 2019/0374182 A1 | 12/2019 | Karim et al. |
| 2019/0380193 A1 | 12/2019 | Matsuhana et al. |
| 2019/0387602 A1 | 12/2019 | Woywode et al. |
| 2019/0391087 A1 | 12/2019 | Matejka et al. |
| 2020/0003708 A1 | 1/2020 | Kobayashi et al. |
| 2020/0003712 A1 | 1/2020 | Kataoka et al. |
| 2020/0041429 A1 | 2/2020 | Cho et al. |
| 2020/0058462 A1 | 2/2020 | Suzuki |
| 2020/0088656 A1 | 3/2020 | Pois et al. |
| 2020/0090826 A1 | 3/2020 | Adler |
| 2020/0103358 A1 | 4/2020 | Wiell et al. |
| 2020/0105492 A1 | 4/2020 | Behling et al. |
| 2020/0154552 A1 | 5/2020 | Suzuki et al. |
| 2020/0155088 A1 | 5/2020 | Gruener et al. |
| 2020/0158662 A1 | 5/2020 | Horiba et al. |
| 2020/0163195 A1 | 5/2020 | Steck et al. |
| 2020/0168427 A1 | 5/2020 | Krokhmal et al. |
| 2020/0182806 A1 | 6/2020 | Kappler et al. |
| 2020/0187339 A1 | 6/2020 | Freudenberger et al. |
| 2020/0191732 A1 | 6/2020 | Taniguchi et al. |
| 2020/0194212 A1 | 6/2020 | Dalakos et al. |
| 2020/0203113 A1 | 6/2020 | Ponard |
| 2020/0225172 A1 | 7/2020 | Sato et al. |
| 2020/0225173 A1 | 7/2020 | Sato et al. |

(56) References Cited

U.S. PATENT DOCUMENTS

| | | | |
|---|---|---|---|
| 2020/0225371 A1 | 7/2020 | Greenberg et al. |
| 2020/0232937 A1 | 7/2020 | Yaroshenko et al. |
| 2020/0234908 A1 | 7/2020 | Fishman et al. |
| 2020/0279351 A1 | 9/2020 | Ratner et al. |
| 2020/0292475 A1 | 9/2020 | Cao et al. |
| 2020/0297297 A1 | 9/2020 | Kok et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0305809 A1 | 10/2020 | Schwoebel et al. |
| 2020/0319120 A1 | 10/2020 | Kitamura et al. |
| 2020/0321184 A1 | 10/2020 | Parker et al. |
| 2020/0330059 A1 | 10/2020 | Fredenberg et al. |
| 2020/0337659 A1 | 10/2020 | Sano et al. |
| 2020/0378904 A1 | 12/2020 | Albarqouni et al. |
| 2020/0378905 A1 | 12/2020 | Safai |
| 2020/0378907 A1 | 12/2020 | Morton |
| 2020/0378908 A1 | 12/2020 | Fujimura et al. |
| 2020/0388461 A1 | 12/2020 | Behling et al. |

FOREIGN PATENT DOCUMENTS

| | | | |
|---|---|---|---|
| CN | 102124537 A | 7/2011 |
| CN | 102325498 | 1/2012 |
| CN | 102551761 A | 7/2012 |
| EP | 0432568 | 6/1991 |
| EP | 0751533 | 1/1997 |
| EP | 1028451 | 8/2000 |
| EP | 1169713 B1 | 1/2006 |
| EP | 3093867 A1 | 11/2016 |
| FR | 2548447 | 1/1985 |
| JP | H06-188092 | 7/1994 |
| JP | H07-056000 | 3/1995 |
| JP | H07-194592 | 8/1995 |
| JP | H08-128971 | 5/1996 |
| JP | H08-184572 | 7/1996 |
| JP | H11-304728 | 11/1999 |
| JP | H11-352079 | 12/1999 |
| JP | 2000-306533 | 11/2000 |
| JP | 2001-021507 | 1/2001 |
| JP | 2003-149392 | 5/2003 |
| JP | 2003-288853 | 10/2003 |
| JP | 2004-089445 | 3/2004 |
| JP | 2004-518262 | 6/2004 |
| JP | 2007-218683 | 8/2007 |
| JP | 2007-265981 | 10/2007 |
| JP | 2007-311185 | 11/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-212058 | 9/2009 |
| JP | 2010-236986 | 10/2010 |
| JP | 2011-029072 | 2/2011 |
| JP | 2011-033537 | 2/2011 |
| JP | 2011-218147 | 11/2011 |
| JP | 2012-032387 | 2/2012 |
| JP | 2012-187341 | 10/2012 |
| JP | 2012-254294 | 12/2012 |
| JP | 2013-508683 | 3/2013 |
| JP | 2013-529984 | 7/2013 |
| JP | 2013-157269 | 8/2013 |
| JP | 2013-160637 | 8/2013 |
| JP | 2013-181811 | 9/2013 |
| JP | 2013-239317 | 11/2013 |
| JP | 2015-002074 | 1/2015 |
| JP | 2015-047306 | 3/2015 |
| JP | 2015-072263 | 4/2015 |
| JP | 2015-077289 | 4/2015 |
| JP | 2017-040618 | 2/2017 |
| KR | 10-2012-0091591 A | 8/2012 |
| KR | 10-2014-0059688 | 5/2014 |
| WO | WO 1995/006952 | 3/1995 |
| WO | WO 1998/011592 | 3/1998 |
| WO | WO 2002/039792 | 5/2002 |
| WO | WO 2003/081631 | 10/2003 |
| WO | WO 2005/109969 | 11/2005 |
| WO | WO 2006/096052 | 9/2006 |
| WO | WO 2007/125833 | 11/2007 |
| WO | WO 2008/068044 | 6/2008 |
| WO | WO 2009/098027 | 8/2009 |
| WO | WO 2009/104560 | 8/2009 |
| WO | WO 2010/109909 | 9/2010 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/118593 | 8/2013 |
| WO | WO 2013/160153 | 10/2013 |
| WO | WO 2013/168468 | 11/2013 |
| WO | WO 2014/054497 | 4/2014 |
| WO | WO 2015/016019 | 2/2015 |
| WO | WO 2015/034791 | 3/2015 |
| WO | WO 2015/066333 | 5/2015 |
| WO | WO 2015/084466 | 6/2015 |
| WO | WO 2015/152490 | 10/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/204850 | 11/2017 |
| WO | WO 2017/213996 | 12/2017 |
| WO | WO 2018/122213 | 7/2018 |
| WO | WO 2018/175570 | 9/2018 |

OTHER PUBLICATIONS

Chang et al., "Ultra-high aspect ratio high-resolution nanofabrication of hard X-ray diffractive optics," Nature Comm. 5:4243, doi: 10.1038/ncomms5243 (2014).

Dittler et al., "A mail-in and user facility for X-ray absorption near-edge structure: the CEI-XANES laboratory X-ray spectrometer at University of Washington," J. Synch. Rad. vol. 26, eight pages, (2019).

Huang et al., "Theoretical analysis and optimization of highly efficient multilayer-coated blazed gratings with high fix-focus constant for the tender X-ray region," Op. Express Vo. 28, No. 2, pp. 821-845 (2020).

Kim et al., "A Simulation Study on the Transfer Characteristics of the Talbot Pattern Through Scintillation Screens in the Grating Interferometer," J. Rad. Sci. and Tech. 42(1), pp. 67-75 (2019).

Kulow et al., "On the Way to Full-Field X-ray Fluorescence Spectroscopy Imaging with Coded Apertures," J. Anal. At. Spectrom. Doi: 10.1039/C9JA00232D (2019).

Li et al., "Production and Heat Properties of an X-ray Reflective Anode Based on a Diamond Heat Buffer Layer," Materials vol. 13, p. 241 (2020).

Zhou et al., "Quasi-parallel X-ray microbeam obtained using a parabolic monocapillary X-ray lens with an embedded square-shaped lead occluder," arXiv:2001.04667 (2020).

Jin et al., "Development of an X-ray tube with two selective targets modulated by a magnetic field," Rev. Sci. Inst. vol. 90, 083105 (2019).

Li et al., "Study on High Thermal Conductivity of X-ray Anode with Composite Diamond Substrate," J. Phys.: Conf. Ser., vol. 1300, 012115 (2019).

"Diamond," Section 10.4.2 of Zorman et al., "Material Aspects of Micro-Nanoelectromechanical Systems," Chapter 10 of Springer Handbook of Nanotechnology, 2nd ed., Barat Bushan, ed. (Springer Science + Business Media, Inc., New York, 2007), pp. 312-314.

"Element Six CVD Diamond Handbook" (Element Six, Luxembourg, 2015).

"High performance benchtop EDXRF spectrometer with Windows® software," published by: Rigaku Corp., Tokyo, Japan; 2017.

"Monochromatic Doubly Curved Crystal Optics," published by: X-Ray Optical Systems, Inc. (XOS), East Greenbush, NY; 2017.

"Optics and Detectors," Section 4 of XS-Ray Data Booklet, 3rd Ed., A.C. Thompson ed. (Lawrence Berkeley Nat'l Lab, Berkeley, CA, 2009).

(56) References Cited

OTHER PUBLICATIONS

"Properties of Solids," Ch. 12 of CRC Handbook of Chemistry and Physics, 90th ed., Devid R. Lide & W.M. "Mickey" Haynes, eds. (CRC Press, Boca Raton, FL, 2009), pp. 12-41-12-46; 12-203-12-212.
"Science and Technology of Future Light Sources", Arthur L. Robinson (LBNL) and Brad Plummer (SLAG), eds. Report Nos. ANL-08/39 / BNL-81895-2008 / LBNL-1090E-2009 / SLAC-R-917 (Lawrence Berkeley Nal'l Lab, Berkeley, CA, Dec. 2008).
"Series 5000 Packaged X-ray Tubes," Product Technical Data Sheet DS006 Rev. G, X-Ray Technologies Inc. (Oxford Insstruments), Scotts Valley, CA (no date).
"Toward Control of Matter: Energy Science Needs for a New Class of X-Ray Light Sources" (Lawrence Berkeley Nal'l Lab, Berkeley, CA, Sep. 2008).
"X-ray Optics for BES Light Source Facilities," Report of the Basic Energy Sciences Workshop on X-ray Optics for BES Light Source Facilities, D. Mills & H. Padmore, Co-Chairs, (U.S. Dept. of Energy, Office of Science, Potomac, MD, Mar. 2013).
Abullian et al., "Quantitative determination of the lateral density and intermolecular correlation between proteins anchored on the membrane surfaces using grazing incidence small-angle X-ray scattering and grazing incidence X-ray fluorescence," Nov. 28, 2012, The Journal of Chemical Physics, vol. 137, pp. 204907-1 to 204907-8.
Adachi et al., "Development of the 17-inch Direct-Conversion Dynamic Flat-panel X-ray Detector (FpD)," Digital R/F (Shimadzu Corp., 2 pages (no date, published—2004 with product release).
Aharonovich et al., "Diamond Nanophotonics," Adv. Op. Mat'ls vol. 2, Issue 10 (2014).
Als-Nielsen et al., "Phase contrast imaging" Sect. 9.3 of Ch. 9 of "Elements of Modern X-ray Physics, Second Edition", (John Wiley & Sons Ltd, Chichester, West Sussex, UK, 2011), pp. 318-329.
Als-Nielsen et al., "Photoelectric Absorption," Ch. 7 of "Elements of Modern X-ray Physics, Second Edition," (John Wiley & Sons Ltd, Chichester, West Sussex, UK, 2011).
Als-Nielsen et al., "Refraction and reflection from interfaces," Ch. 3 of "Elements of Modern X-ray Physics, Second Edition," (John Wiley & Sons Ltd., Chichester, West Sussex, UK, 2011), pp. 69-112.
Als-Nielsen et al., "X-rays and their interaction with matter", and "Sources", Ch. 1 & 2 of "Elements of Modern X-ray Physics, Second Edition" (John Wiley & Sons Ltd, Chichester, West Sussex, UK, 2011).
Altapova et al., "Phase contrast laminography based on Talbot interferometry," Opt. Express, vol. 20, No. 6, (2012) pp. 6496-6508.
Ando et al., "Smooth and high-rate reactive ion etching of diamond," Diamond and Related Materials, vol. 11, (2002) pp. 824-827.
Arfelli et al., "Mammography with Synchrotron Radiation: Phase-Detection Techniques," Radiology vol. 215, (2000), pp. 286-293.
Arndt et al., Focusing Mirrors for Use with Microfocus X-ray Tubes, 1998, Journal of Applied Crystallography, vol. 31, pp. 733-741.
Bachucki et al., "Laboratory-based double X-ray spectrometer for simultaneous X-ray emission and X-ray absorption studies," J. Anal. Atomic Spectr. DOI:10.1039/C9JA00159J (2019).
Balaic et al., "X-ray optics of tapered capillaries," Appl. Opt. vol. 34 (Nov. 1995) pp. 7263-7272.
Baltes et al., "Coherent and incoherent grating reconstruction," J. Opt. Soc. Am. A vol. 3(8), (1986), pp. 1268-1275.
Barbee JR., "Multilayers for x-ray optics," Opt. Eng. vol. 25 (Aug. 1986) pp. 898-915.
Baron et al., "A compact optical design for Bragg reflections near backscattering," J. Synchrotron Rad., vol. 8 (2001), pp. 1127-1130.
Bech, "In-vivo dark-field and phase-contrast x-ray imaging," Scientific Reports 3, (2013), Article No. 03209.
Bech, "X-ray imaging with a grating interferometer," University of Copenhagan PhD. Thesis, (May 1, 2009).
Bergamin et al., "Measuring small lattice distortions in Si-crystals by phase-contrast x-ray topography," J. Phys. D: Appl. Phys. vol. 33 (Dec. 31, 2000) pp. 2678-2682.
Bernstorff, "Grazing Incidence Small Angle X-ray Scattering (GISAXS)," Presentation at Advanced School on Synchrotron and Free Electron Laser Sources and their Multidisciplinary Applications, Apr. 2008, Trieste, Italy.
Bilderback et al., "Single Capillaries," Ch. 29 of "Handbook of Optics vol. III, 2nd Ed." (McGraw Hill, New York, 2001).
Birkholz, "Chapter 4: Grazing Incidence Configurations," Thin Film Analysis by X-ray Scattering (Wiley-VCH Verlag GmbH & Co. KGaA, Weinheim, Germany, 2006).
Bjeoumikhov et al., "A modular system for XRF and XRD applications consisting of a microfocus X-ray source and different capillary optics," X-ray Spectrometry, vol. 33 (2004), pp. 312-316.
Bjeoumikhov et al., "Capillary Optics for X-Rays," Ch. 18 of "Modern Developments in X-Ray and Neutron Optics," A. Erko et al., eds. (Springer, Berlin, Germany, 2008), pp. 287-306.
Canberra Model S-5005 WinAxil X-Ray Analysis Software, published by: Canberra Eurisys Benelux N.V./S.A.,Zellik, Belgium; Jun. 2004.
Cerrina, "The Schwarzschild Objective," Ch. 27 of "Handbook of Optics vol. III, 2nd Ed." (McGraw Hill, New York, 2001).
Chen et al., "Advance in detection of low sulfur content by wavelength dispersive XRF," Proceedings of the Annual ISA Analysis Division Symposium (2002).
Chen et al., "Doubly curved crystal (DCC) X-ray optics and applications," Powder Diffraction, vol. 17(2) (2002), pp. 99-103.
Chen et al., "Guiding and focusing neutron beams using capillary optics," Nature vol. 357 (Jun. 4, 1992), pp. 391-393.
Chervenak et al., "Experimental thick-target bremsstrahlung spectra from electrons in the range 10 to 30 keV", Phys. Rev. A vol. 12 (1975), pp. 26-33.
Chon, "Measurement of Roundness for an X-Ray Mono-Capillary Optic by Using Computed Tomography," J. Korean Phys. Soc. vol. 74, No. 9, pp. 901-906 (May 2019).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cockcroft et al., "Chapter 2: Experimental Setups," Powder Diffraction: Theory and Practice, R.E. Dinnebier and S.J.L. Billinge, eds (Royal Society of Chemistry Publishing, London, UK, 2008).
Cohen et al., "Tunable laboratory extended x-ray absorption fine structure system," Rev. Sci. Instr. vol. 51, No. 3, Mar. 1980, pp. 273-277.
Cong et al., "Fourier transform-based iterative method for differential phase-contrast computed tomography", Opt. Lett. vol. 37 (2012), pp. 1784-1786.
Cornaby et al., "Advances in X-ray Microfocusing with Monocapillary Optics at CHESS," CHESS News Magazine (2009), pp. 63-66.
Cornaby et al., "Design of Single-Bounce Monocapillary X-ray Optics," Advances in X-ray Analysis: Proceedings of the 55th Annual Conference on Applications of X-ray Analysis, vol. 50, (International Centre for Diffraction Data (ICDD), 2007), pp. 194-200.
Cornaby, "The Handbook of X-ray Single Bounce Monocapillary Optics, Including Optical Design and Synchrotron Applications" (PhD Dissertation, Cornell University, Ithaca, NY, May 2008).
David et al., "Fabrication of diffraction gratings for hard x-ray phase contrast imaging," Microelectron. Eng. vol. 84, (2007), pp. 1172-1177.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages). Jun. 18, 2010.

(56) References Cited

OTHER PUBLICATIONS

Ding et al., "Reactive Ion Etching of CVD Diamond Films for MEMS Applications," Micromachining and Microfabrication, Proc. SPIE vol. 4230 (2000), pp. 224-230.

Dobrovinskaya et al., "Thermal Properties," Sect. 2.1.5 of "Sapphire: Material, Manufacturing Applications" (Springer Science + Business Media, New York, 2009).

Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).

Erko et al., "X-ray Optics," Ch. 3 of "Handbook of Practical X-Ray Fluorescence Analysis," B. Beckhoff et al., eds. (Springer, Berlin, Germany, 2006), pp. 85-198.

Falcone et al., "New directions in X-ray microscopy," Contemporary Physics, vol. 52, No. 4, (Jul.-Aug. 2010), pp. 293-318.

Fernández-Ruiz, "TXRF Spectrometry as a Powerful Tool for the Study of Metallic Traces in Biological Systems," Development in Analytical Chemistry, vol. 1 (2014), pp. 1-14.

Freund, "Mirrors for Synchrotron Beamlines," Ch. 26 of "Handbook of Optics vol. III, 2nd Ed." (McGraw Hill, New York, 2001).

Ge et al., "Investigation of the partially coherent effects in a 2D Talbot interferometer," Anal. Bioanal. Chem. vol. 401, (2011), pp. 865-870. Apr. 29, 2011 pub Jun. 14, 2011.

Gibson et al., "Polycapillary Optics: An Enabling Technology for New Applications," Advances in X-ray Analysis, vol. 45 (2002), pp. 286-297.

Gonzales et al., "Angular Distribution of Bremsstrahlung Produced by 10-Kev and 20 Kev Electrons Incident on a Thick Au Target", in Application of Accelerators in Research and Industry, AIP Conf. Proc. 1221 (2013), pp. 114-117.

Gonzales et al., "Angular distribution of thick-target bremsstrahlung produced by electrons with initial energies ranging from 10 to 20 keV incident on Ag", Phys. Rev. A vol. 84 (2011): 052726.

Günther et al., "Full-field structured-illumination super-responution X-ray transmission microscopy," Nature Comm. 10:2494 (2019) and supplementary information.

Guttmann et al., "Ellipsoidal capillary as condenser for the BESSSY full-field x-ray microscope," J. Phys. Conf. Ser. vol. 186 (2009): 012064.

Harasse et al., "Iterative reconstruction in x-ray computed laminography from differential phase measurements", Opt. Express. vol. 19 (2011), pp. 16560-16573.

Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.

Harasse et al., "X-ray Phase Laminography with Talbot Interferometer", in Developments in X-Ray Tomography VII, Proc. SPIE vol. 7804 (2010), 780411.

Hasse et al., "New developments in laboratory-based x-ray sources and optics," Adv. In Laboratory-based X-Ray Sources, Optics, and Applications VI, ed. A.M. Khounsary, Proc. SPIE vol. 10387, 103870B-1 (2017).

Hemraj-Benny et al., "Near-Edge X-ray Absorption Fine Structure Spectroscopy as a Tool for Investigating Nanomaterials," Small, vol. 2(1), (2006), pp. 26-35.

Henke et al., "X-ray interactions: photoabsorption, scattering, transmission, and reflection at E=50-30000 eV, Z=1-92," Atomic Data and Nuclear Data Tables, vol. 54 (No. 2) (Jul. 1993), pp. 181-342.

Hennekam et al., "Trace metal analysis of sediment cores using a novel X-ray fluorescence core scanning method," Quaternary Int'l, https://doi.org/10.1016/j.quaint.2018.10.018 (2018).

Honma et al., Full-automatic XAFS Measurement System of the Engineering Science Research II beamline BL14B2 at Spring-8, 2011, AIP Conference Proceedings 1234, pp. 13-16.

Howard et al., "High-Definition X-ray Fluorescence Elemental Mapping of Paintings," Anal. Chem., 2012, vol. 84(7), pp. 3278-3286.

Howells, "Gratings and Monochromators in the VUV and Soft X-RAY Spectral Region," Ch. 21 of Handbook of Optics vol. III, 2nd Ed. (McGraw Hill, New York, 2001).

Howells, "Mirrors for Synchrotron-Radiation Beamlines," Publication LBL-34750 (Lawrence Berkeley Laboratory, Berkeley, CA, Sep. 1993).

Hrdý et al, "Diffractive-Refractive Optics: X-ray Crystal Monochromators with Profiled Diffracting Surfaces," Ch. 20 of "Modern Developments in X-Ray and Neutron Optics," A. Erko et al., eds. (Springer, Berlin Heidelberg New York, 2008).

Hwang et al, "New etching process for device fabrication using diamond," Diamond & Related Materials, vol. 13 (2004) pp. 2207-2210.

Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

Ihsan et al., "A microfocus X-ray tube based on a microstructured X-ray target", Nuclear Instruments and Methods in Physics Research B vol. 267 (2009) pp. 3566-3573.

Ishisaka et al., "A New Method of Analyzing Edge Effect in Phase Contrast Imaging with Incoherent X-rays," Optical Review, vol. 7, No. 6, (2000), pp. 566-572.

Ito et al., "A Stable In-Laboratory EXAFS Measurement System," Jap. J. Appl. Phys., vol. 22, No. 2, Feb. 1, 1983, pp. 357-360.

Itoh et al., "Two-dimensional grating-based X-ray phase-contrast imaging using Fourier transform phase retrieval," Op. Express, vol. 19, No. 4 (2011) pp. 3339-3346.

Janssens et al, "Recent trends in quantitative aspects of microscopic X-ray fluorescence analysis," TrAC Trends in Analytical Chemistry 29.6 (Jun. 2010): 464-478.

Jahrman et al., "Vacuum formed temporary spherically and toroidally bent crystal analyzers for x-ray absorption and x-ray emission spectroscopy," Rev. Sci. Inst. vol. 90, 013106 (2019).

Jiang et al., "X-Ray Phase-Contrast Imaging with Three 2D Gratings," Int. J. Biomed. Imaging, (2008), 827152, 8 pages.

Joy, "Astronomical X-ray Optics," Ch. 28 of "Handbook of Optics vol. III, 2nd Ed.," (McGraw Hill, New York, 2001).

Kalasova et al., "Characterization of a laboratory-based X-ray computed nonotomography system for propagation-based method of phase contrast imaging," IEEE Trans. On Instr. And Meas., DOI 10.1109/TIM.2019.2910338 (2019).

Keyrilainen et al., "Phase contrast X-ray imaging of breast," Acta Radiologica, vol. 51 (8), (2010), pp. 866-884. Jan. 18, 2010 pub Jun. 15, 2010.

Kidalov et al., "Thermal Conductivity of Diamond Composites," Materials, vol. 2 (2009) pp. 2467-2495.

Kido et al., "Bone Cartilage Imaging with X-ray Interferometry using a Practical X-ray Tube", in Medical Imaging 2010: Physics of Medical Imaging, Proc. SPIE vol. 7622 (2010), 762240.

Kim, "Talbot images of wavelength-scale amplitude gratings," Opt. Express vol. 20(5), (2012), pp. 4904-4920.

Kim et al., "Observation of the Talbot Effect at Beamline 6C Bio Medical Imaging of he Pohang Light Source—II," J. Korean Phys. Soc., vol. 74, No. 10, pp. 935-940 (May 2019).

Kirkpatrick et al., "Formation of Optical Images by X-Rays", J. Opt. Soc. Am. vol. 38(9) (1948), pp. 766-774.

Kirz, "Phase zone plates for x rays and the extreme uv," J. Op. Soc. Am. vol. 64 (Mar. 1974), pp. 301-309.

Kirz et al., "The History and Future of X-ray Microscopy", J. Physics: Conden. Series vol. 186 (2009): 012001.

Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.

Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).

Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).

(56) References Cited

OTHER PUBLICATIONS

Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906. Jul. 7, 2010 pub Dec. 7, 2010.
Kumakhov et al., "Multiple reflection from surface X-ray optics," Physics Reports, vol. 191(5), (1990), pp. 289-350.
Kumakhov, "X-ray Capillary Optics. History of Development and Present Status" in Kumakhov Optics and Application, Proc. SPIE 4155 (2000), pp. 2-12.
Kuwabara et al., "Hard-X-ray Phase-Difference Microscopy with a Low-Brilliance Laboratory X-ray Source", Appl. Phys. Express vol. 4 (2011) 062502.
Kuznetsov, "X-Ray Optics Calculator," Institute of Microelectronics Technology and High Purity Materials, Russian Academy of Sciences (IMT RAS), Chernogolovka, Russia (6 pages submitted); 2016.
Lagomarsino et al., "Reflective Optical Arrays," Ch. 19 of "Modern Developments in X-Ray and Neutron Optics," A. Erko et al. eds. (Springer, Berlin, Germany, 2008), pp. 307-317.
Lai, "X-Ray Microfocusing Optics," Slide Presentation from Argonne National Laboratory, 71 slides, Cheiron Summer School 2007.
Langhoff et al., "X-ray Sources," Ch. 2 of "Handbook of Practical X-Ray Fluorescence Analysis," B. Beckhoff et al., eds. (Springer, Berlin Heidelberg New York, 2006), pp. 33-82.
Lechner et al., "Silicon drift detecors for high count rate X-ray spectroscopy at room temperature," Nuclear Instruments and Methods, vol. 458A (2001), pp. 281-287.
Leenaers et al., "Application of Glancing Incidence X-ray Analysis," 1997, X-ray Spectrometry, vol. 26, pp. 115-121.
Lengeler et al., "Refractive X-ray Optics," Ch. 20 of "Handbook of Optics vol. III, 2nd Ed." (McGraw Hill, New York, 2001.
Li et al., "Source-optic-crystal optimisation for compact monochromatic imaging," Proc. SPIE 5537 (2004), pp. 105-114.
Li et al., "X-ray phase-contrast imaging using cascade Talbot-Lau interferometers," Proc. SPIE 10964 (2018), pp. 1096469-1-1096469-6.
Lohmann et al., "An interferometer based on the Talbot effect," Optics Communications vol. 2 (1971), pp. 413-415.
Lübcke et al., "Soft X-ray nanoscale imaging using a sub-pixel resolution charge coupled device (CCD) camera," Ref. Sci. Instrum. vol. 90, 043111 (2019).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Macdonald et al., "An Introduction to X-ray and Neutron Optics," Ch. 19 of "Handbook of Optics vol. III, 2nd Ed." (McGraw Hill, New York, 2001).
Macdonald et al., "Polycapillary and Multichannel Plate X-Ray Optics," Ch. 30 of "Handbook of Optics vol. III, 2nd Ed.," (McGraw Hill, New York, 2001).
Macdonald et al., "Polycapillary X-ray Optics for Microdiffraction," J. Appl. Cryst., vol. 32 (1999) pp. 160-167.
Macdonald, "Focusing Polycapillary Optics and Their Applications," X-Ray Optics and Instrumentation, vol. 2010, (Oct. 2010): 867049.
Maj et al., "Etching methods for improving surface imperfections of diamonds used for x-ray monochromators," Adv. X-ray Anal., vol. 48 (2005), pp. 176-182.
Malgrange, "X-ray Optics for Synchrotron Radiation," ACTA Physica Polinica A, vol. 82(1) (1992) pp. 13-32.
Malzer et al., "A laboratory spectrometer for high throughput X-ray emission spectroscopy in catalysis research," Rev. Sci. Inst. 89, 113111 (2018).
Masuda et al., "Fabrication of Through-Hole Diamond Membranes by Plasma Etching Using Anodic Porous Alumina Mask," Electrochemical and Solid-State Letters, vol. 4(11) (2001) pp. G101-G103.
Matsushita, "Mirrors and Multilayers," Slide Presentation from Photon Factor, Tsukuba, Japan, 65 slides, (Cheiron School 2009, Sprint-8, Japan, Nov. 2009).
Matsushita, "X-ray monochromators," Slide Presentation from Photon Factory, Tsukuba, Japan, 70 slides, (Cheiron School 2009, Spring-8, Japan, Nov. 2009).
Matsuyama et al., "Wavefront measurement for a hard-X-ray nanobeam using single-grating interferometry", Opt Express vol. 20 (2012), pp. 24977-24986.
Miao et al., "Motionless phase stepping in X-ray phase contrast imaging with a compact source," Proceedings of the National Academy of Sciences, vol. 110(48), (2013), pp. 19268-19272.
Michette, "Zone and Phase Plates, Bragg-Fresnel Optics," Ch. 23 of "Handbook of Optics vol. III, 2nd Ed.," (McGraw Hill, New York, 2001).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Biomedical Imaging by Talbot-Type X-Ray Phase Tomography" in Developments in X-Ray Tomography V, Proc. SPIE vol. 6318 (2006) 63180T.
Momose et al., "Grating-Based X-ray Phase Imaging Using Multiline X-ray Source", Jpn. J. Appl. Phys. vol. 48 (2009), 076512.
Momose et al., "Phase Tomography by X-ray Talbot Interferometry for Biological Imaging" Jpn. J. Appl. Phys. vol. 45 2006 pp. 5254-5262.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Phase-Contrast X-Ray Imaging Using an X-Ray Interferometer for Biological Imaging", Analytical Sciences vol. 17 Supplement (2001), pp. i527-i530.
Momose et al., "Sensitivity of X-ray Phase Imaging Based on Talbot Interferometry", Jpn. J. Appl. Phys. vol. 47 (2008), pp. 8077-8080.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging—From Static Observation to Dynamic Observation-", in International Workshop on X-ray and Neutron Phase Imaging with Gratings AIP Conf. Proc. vol. 1466, (2012), pp. 67-77.
Momose et al., "X-ray Phase Imaging Using Lau Effect", Appl. Phys. Express vol. 4 (2011) 066603.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, WI, USA, 2010), pp. 281-320.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "X-ray Talbot Interferometry with Capillary Plates", Jpn. J. Appl. Phys. vol. 45 (2006), pp. 314-316.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "High-speed X-ray phase imaging and X-ray phase tomography with Talbot interferometer and white synchrotron radiation", Opt. Express vol. 17 (2009), pp. 12540-12545.
Momose et al., "Phase Imaging with an X-ray Talbot Interferometer", Advances in X-ray Analysis vol. 49(3) (2006), pp. 21-30.
Momose et al.,"Demonstration of X-Ray Talbot Interferometry", Jpn. J. Appl. Phys. vol. 42 (2003), pp. L866-L868.
Momose et al.,"Phase Tomography Using an X-ray Talbot Interferometer", in Developments in X-Ray Tomography IV, Proc. SPIE vol. 5535 (2004), pp. 352-360.

(56) References Cited

OTHER PUBLICATIONS

Momose, "Recent Advances in X-ray Phase Imaging", Jpn. J. Appl. Phys. vol. 44 (2005), pp. 6355-6367.
Montgomery, "Self Imaging Objects of Infinite Aperture," J. Opt. Soc. Am. vol. 57(6), (1967), pp. 772-778.
Morimoto et al., "Development of multiline embedded X-ray targets for X-ray phase contrast imaging," XTOP 2012 Book of Abstracts, (Ioffe Physical-Technical Institute of the Russian Academy of Sciences, St. Petersburg, Russia, 2012), pp. 74-75.
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Noda et al., "Fabrication of Diffraction Grating with High Aspect Ratio Using X-ray Lithography Technique for X-ray Phase Imaging," Jpn. J. Appl. Phys. vol. 46, (2007), pp. 849-851.
Noda et al., "Fabrication of High Aspect Ratio X-ray Grating Using X-ray Lithography" J. Solid Mech_ Mater. Eng. vol. 3 (2009), pp. 416-423.
Nojeh, "Carbon Nanotube Electron Sources: From Electron Beams to Energy Conversion and Optophononics", ISRN Nanomaterials vol. 2014 (2014): 879827.
Nuhn, "From storage rings to free electron lasers for hard x-rays", J.A37 Phys.: Condens. Matter vol. 16 (2004), pp. S3413-S34121.
Nykanen et al., "X-ray scattering in full-field digital mammography," Med. Phys. vol. 30(7), (2003), pp. 1864-1873.
Oji et al., Automatic XAFS measurement system developed at BL14B2 in SPring-8, Available online Nov. 15, 2011, Journal of Synchrotron Radiation, vol. 19, pp. 54-59.
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Otendal et al., A 9 keV electron-impact liquid-gallium-jet x-ray source, Rev. Sci. Instrum. vol. 79 (2008): 016102.
Oxford Instruments Inc., Series 5000 Model XTF5011 X-ray Tube information, Jun. 1998, 3 pages.
Parrill et al., "GISAXS—Glancing Incidence Small Angle X-ray Scattering," Journal de Physique IV, vol. 3 (Dec. 1993), pp. 411-417.
Paxscan Flat Panel X-ray Imaging, Varian Sales Brochure, (Varian Medical Systems, Palo Alto, CA, Nov. 11, 2004).
Pfeiffer et al., "Hard-X-ray dark-field imaging using a grating interferometer," Nature Materials vol. 7, (2008), pp. 134-137.
Pfeiffer et al., "Hard x-ray phase tomography with low brilliance x-ray sources," Phys. Rev. Lett. vol. 98, (2007), 108105.
Pfeiffer et al., "Phase retrieval and differential phase-contrast imaging with low-brilliance X-ray sources," Nature Physics vol. 2, (2006), pp. 258-261.

Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382 (equation quoted from p. 336).
Prewitt et al., "FIB Repair of 5X Recticles and Effects on IC Quality," Integrated Circuit Metrology, Inspection, and Process Control VII, Proc. SPIE vol. 1926 (1993), pp. 517-526.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Pushie et al., "Elemental and Chemically Specific X-ray Fluorescence Imaging of Biological Systems," Chem. Rev. 114:17, 8499-8541 (2014).
Pushie et al., "Prion protein expression level alters regional copper, iron and zinc content in the mouse brain," Metallomics vol. 3, 206-214 (2011).
Qin et al., "Trace metal imaging with high spatial resolution: Applications in biomedicine," Metallomics, vol. 3 (Jan. 2011), pp. 28-37.
Rayleigh, "On copying diffraction gratings and some phenomena connected therewith," Philos. Mag. vol. 11 (1881), pp. 196-205.
Renaud et al., "Probing surface and interface morphology with Grazing Incidence Small Angle X-ray Scattering," Surface Science Reports, vol. 64:8 (2009), pp. 255-380.
Riege, "Electron Emission from Ferroelectrics—A Review", CERN Report Cern AT/93-18 (Cern, Geneva, Switzerland, Jul. 1993).
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Röntgen, Ueber eine neue Art von Strahlen (Wurzburg Verlag, Warzburg, Germany, 1896) also, in English, "On a New Kind of Rays," Nature vol. 53 (Jan. 23, 1896). pp. 274-276.
Rovezzi, "Study of the local order around magnetic impurities in semiconductors for spintronics." PhD Dissertation, Condensed Matter, Université Joseph-Fourier—Grenoble I, 2009, English <tel-00442852>.
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholz, "X-ray Tubes and Monochromators," Technical Workshop EPIV, Universitat Wurzburg (2007); 41 slides, 2007.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germay, 2006), pp. 85-198.
Scordo et al., "Pyrolitic Graphite Mosaic Drystal Thickness and Mosaicity Optimization for an Extended Source Von Hamos X-ray Spectrometer," Condens. Matter Vo. 4, pp. 38-52 (2019).
Scott, "Hybrid Semiconductor Detectors for High Spatial Resolution Phase-contrast X-ray Imaging," Thesis, University of Waterloo, Department of Electrical and Computer Engineering, 2019.
Sebert, "Flat-panel detectors:how much better are they?" Pediatr. Radiol. vol. 36 (Suppl 2), (2006), pp. 173-181.
Seifert et al., "Talbot-Lau x-ray phase-contrast setup for fast scanning of large samples," Sci. Rep. 9:4199, pp. 1-11 (2019).
Shen, "Polarizing Crystal Optics," Ch. 25 of "Handbook of Optics vol. III, 2nd Ed.," (McGraw Hill, New York, 2001).
Shields et al., "Overview of Polycapillary X-ray Optics," Powder Diffraction, vol. 17(2) (Jun. 2002) pp. 70-80.

(56) References Cited

OTHER PUBLICATIONS

Shimura et al., "Hard x-ray phase contrast imaging using a tabletop Talbot-Lau interferometer with multiline embedded x-ray targets", Opt. Lett. vol. 38(2) (2013), pp. 157-159.
Siddons, "Crystal Monochromators and Bent Crystals," Ch. 22 of "Handbook of Optics vol. III, 2nd Ed.," (McGraw Hill, New York, 2001).
Smith, "Fundamentals of Digital Mammography:Physics, Technology and Practical Considerations," Publication R-BI-016 (Hologic, Inc., Bedford, MA, Mar. 2005).
Snigirev et al., "Hard X-Ray Microoptics," Ch. 17 of "Modern Developments in X-Ray and Neutron Optics," A. Erko et al., eds (Springer, Berlin, Germany, 2008), pp. 255-285.
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Spiller, "Multilayers," Ch. 24 of "Handbook of Optics vol. III, 2nd Ed.," (McGraw Hill, New York, 2001).
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Strüder et al., "Silicon Drift Detectors for X-ray Imaging," Presentation at Detector Workshop on Synchrotron Radiation Instrumentation, 54 slides, (Argonne Nat'l Lab, Argonne, IL Dec. 8, 2005), available at: <http://www.aps.anl.gov/News/Conferences/2005/Synchrotron_Radiation_Instrumentation/Presentations/Strueder.pdf>.
Strüder et al., "X-Ray Detectors," Ch. 4 of "X-ray Spectrometry: Recent Technological Advances," K. Tsuji et al. eds. (John Wiley & Sons, Ltd. Chichester, West Sussex, UK, 2004), pp. 63-131.
Stupple et al., "Modeling of Heat Transfer in an Aluminum X-Ray Anode Employing a Chemical Vapor Deposited Diamond Heat Spreader," J. Heat Transfer, Vo. 140, 124501-1-5 (Dec. 2018).
Sun et al., "Combined optic system based on polycapillary X-ray optics and single-bounce monocapillary optics for focusing X-rays from a conventional laboratory X-ray source," Nucl. Inst. and Methods in Phys. Res. A 802 (2015) pp. 5-9.
Sun et al., "Numerical design of in-line X-ray phase-contrast imaging based on ellipsoidal single-bounce monocapillary," Nucl. Inst. And Methods in Phys. Res. A746 (2014) pp. 33-38.
Sunday et al., "X-ray Metrology for the Semiconductor Industry Tutorial," J. Res. Nat'l Inst. Stan. vol. 124: 124003 (2019); https://doi.org/10.6028/jres.124.003.
Suzuki et al., "Hard X-ray Imaging Microscopy using X-ray Guide Tube as Beam Condenser for Field Illumination," J. Phys.: Conf. Ser. vol. 463 (2013): 012028.
Suzuki, "Development of the DIGITEX Safire Cardiac System Equipped with Direct conversion Flat Panel Detector," Digital Angio Technical Report (Shimadzu Corp., Kyoto, Japan, no date, published—2004 with product release).
Takahama, "RADspeed safire Digital General Radiography System Equipped with New Direct-Conversion FPD," Medical Now, No. 62 (2007).
Takeda et al., "Differential Phase X-ray Imaging Microscopy with X-ray Talbot Interferometer" Appl. Phys. Express vol. 1 (2008) 117002.
Takeda et al., "X-Ray Phase Imaging with Single Phase Grating", Jpn. J. Appl. Phys. vol. 46 (2007), pp. L89-L91.
Takeda et al., "In vivo physiological saline-infused hepatic vessel imaging using a two-crystal-interferometer-based phase-contrast X-ray technique", J. Synchrotron Radiation vol. 19 (2012), pp. 252-256.
Talbot, "Facts relating to optical science No IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tang et al., "Micro-computed tomography (Micro-CT): a novel appraoch for intraoperative breast cancer specimen imaging," Breast Cancer Res. Treat. vol. 139, pp. 311-316 (2013).
Taniguchi et al., "Diamond nanoimprint lithography," Nanotechnology, vol. 13 (2002) pp. 592-596.
Terzano et al., Recent advances in analysis of trace elements in environmental samples by X-ray based techniques (IUPAC Technical Report), Pure Appl. Chem. 2019.
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Touzelbaev et al., "Applications of micron-scale passive diamond layers for the integrated circuits and microelectromechanical systems industries," Diamond and Rel. Mat'ls, vol. 7 (1998) pp. 1-14.
Tsuji et al., "X-Ray Spectrometry: Recent Technological Acvances," John Wiley & Sons Ltd. Chichester, West Susses, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al.,"Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernicke phase constrast X-ray microscopy," Biotech. Adv., vol. 31 (2013) pp. 387-392.
Wang et al., "Non-invasive classification of microcalcifications with phase-contrast X-ray mammography," Nature Comm. vol. 5:3797, pp. 1-9 (2014).
Wang, On the single-photon-counting (SPC) modes of imaging using an XFEL source, presented at IWORLD2015.
Wang et al., "Precise patterning of diamond films for MEMS application" Journal of Materials Processing Technology vol. 127 (2002), pp. 230-233.
Wang et al., "Measuring the average slope error of a single-bounce ellopsoidal glass monocapillary X-ray condenser based on an X-ray source with an adjustable source size," Nucl. Inst. And Meth. A934, 36-40 (2019).
Wang et al., "High beam-current density of a 10-keV nano-focus X-ray source," Nucl. Inst. And Meth. A940, 475-478 (2019).
Wansleben et al., "Photon flux determination of a liquid-metal jet x-ray source by means of photon scattering," arXiv:1903.06024v1, Mar. 14, 2019.
Weitkamp et al., "Design aspects of X-ray grating interferometry," in International Workshop on X-ray and Neutron Phase Imaging with Gratings AIP Conf. Proc. vol. 1466, (2012), pp. 84-89.
Weitkamp et al., "Hard X-ray phase imaging and tomography with a grating interferometer," Proc. SPIE vol. 5535, (2004), pp. 137-142.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., Tomography with grating interferometers at low-brilliance sources, 2006, SPIE, vol. 6318, pp. 0S-1 to 0S-10.
Weitkamp et al., "X-ray phase imaging with a grating interferometer," Opt. Express vol. 13(16), (2005), pp. 6296-6304.

(56) References Cited

OTHER PUBLICATIONS

Weitkamp et al., "X-ray wavefront analysis and optics characterization with a grating interferometer," Appl. Phys. Lett. vol. 86, (2005), 054101.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wittry et al., "Properties of fixed-position Bragg diffractors for parallel detection of x-ray spectra," Rev. Sci. Instr. vol. 64, pp. 2195-2200 (1993).
Wobrauschek et al., "Energy Dispersive, X-Ray Fluorescence Analysis," Encyclopedia of Analytical Chemistry, R.A. Meyers, Ed. (Wiley 2010).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wolter, "Spiegelsysteme streifenden Einfalls als abbildende Optiken fur Rontgenstrahlen" [Grazing Incidence Reflector Systems as Imaging Optics for X-rays] Annalen der Physik vol. 445, Issue 1-2 (1952), pp. 94-114.
X-ray-Optics.de Website, http://www.x-ray-optics.de/, accessed Feb. 13, 2016.
Yakimchuk et al., "Ellipsoidal Concentrators for Laboratory X-ray Sources: Analytical approaches for optimization," Mar. 22, 2013, Crystallography Reports, vol. 58, No. 2, pp. 355-364.
Yamamoto, "Fundamental physics of vacuum electron sources", Reports on Progress in Physics vol. 69, (2006), pp. 181-232.
Yanagihara et al., "X-Ray Optics," Ch. 3 of "X-ray Spectrometry: Recent Technological Advances," K. Tsuji et al. eds. (John Wiley & Sons, Ltd. Chichester, West Sussex, UK, 2004), pp. 63-131.
Yang et al., "Analysis of Intrinsic Stress in Diamond Films by X-ray Diffraction," Advances in X-ray Analysis, vol. 43 (2000), pp. 151-156.
Yashiro et al., "Distribution of unresolvable anisotropic microstructures revealed in visibility-contrast images using x-ray Talbot interferometry", Phys. Rev. B vol. 84 (2011), 094106.
Yashiro et al., "Hard x-ray phase-imaging microscopy using the self-imaging phenomenon of a transmission grating", Phys. Rev. A vol. 82 (2010), 043822.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Efficiency of capturing a phase image using cone-beam x-ray Talbot interferometry", J. Opt. Soc. Am. A vol. 25 (2008), pp. 2025-2039.
Yashiro et al., "On the origin of visibility contrast in x-ray Talbot interferometry", Opt. Express (2010), pp. 16890-16901.
Yashiro et al., "Optimal Design of Transmission Grating for X-ray Talbot Interferometer", Advances in X-ray Analysis vol. 49(3) (2006), pp. 375-379.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et. al., "Hard-X-Ray Phase-Difference Microscopy Using a Fresnel Zone Plate and a Transmission Grating", Phys. Rev. Lett. vol. 103 (2009), 180801.
Yu et al., "Morphology and Microstructure of Tungsten Films by Magnetron Sputtering," Mat. Sci. Forum, vol. 913, pp. 416-423 (2018).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Ellipsoidal and parabolic glass capillaries as condensers for x-ray microscopes," Appl. Opt. vol. 47 (May 2008), pp. 2376-2381.
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Fabrication of Diamond Microstructures by Using Dry and Wet Etching Methods", Plasma Science and Technology vol. 15(6) (Jun. 2013), pp. 552-554.
Zhang et al., "Measurement of the inner diameter of monocapillary with confocal X-ray scattering technology based on capillary X-ray optics," Appl. Opt. (Jan. 8, 2019), doc Id 351489, pp. 1-10.
Mijovilovich et al., "Analysis of trace metal distribution in plants with lab-based microscopic X-ray fluorescence imaging," Plant Methods, vol. 16, No. 82, 21 pages (2020).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Paunesku et al., "X-Ray Fluorescence Microprobe Imaging in Biology and Medicine," J. Cell. Biochem. vol. 99, pp. 1489-1502 (2006).
Penkov et al., "X-Ray Calc: A software for the simulation of X-ray reflectivity," SoftwareX, vol. 12, p. 100528 (2020).
Romano et al., "Microfabrication of X-ray Optics by Metal Assisted Chemical Etching: A Review," Micromachines, vol. 11, No. 589, 23 pages (2020).
Salditt, "Nanoscale Photonic Imaging," Topics in Applied Physics, vol. 134, T. Salditt et al., eds., Springer Open, 2020.
Senba et al., "Stable sub-micrometre high-flux probe for soft X-ray ARPES using a monolithic Wolter mirror," J. Synch. Rad., vol. 27, 5 pages, (2020).
Taphorn et al., "Grating-based spectral X-ray dark-field imaging for correlation with structural size measures," Sci. Reports, vol. 10, 13195 (2020).
Tucker, "Design of X-Ray Source for Real-Time Computed Tomography," Dissertation, Missouri Univ. of Sci. and Tech., Scholars' Mine, 104 pages (2020).
Wilde et al., "Modeling of an X-ray grating-based imaging interferometer using ray tracing," Op. Express vol. 28, No. 17, p. 24657 (2020).
Zhou et al., "A study of new type electric field modulation multi-target X-ray source," Nucl. Inst. and Methods in Physics Research A, https://doi.org/10.1016/j.nima.2020.164342 (2020).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Akan et al., "Metal-Assisted Chemical Etching and Electroless Deposition for Fabrication of Hard X-ray Pd/Si Zone Plates," Micromachines, vol. 11, 301; doi:10.3390/mi11030301 (2020).
Hashimoto et al., "Improved reconstruction method for phase stepping data with stepping errors and dose fluctuations," Optics Express, vol. 28, No. 11, pp. 16363-16384 (2020).
Momose et al., "Recent Progress in X-ray and Neutron Phase Imaging with Gratings," Quantum Beam Science, vol. 4, No. 9; doi:10.3390/qubs4010009 (2020).
Takeo et al., "Soft x-ray nanobeam formed by an ellipsoidal mirror," Appl. Phys. Lett., vol. 116, 121102 (2020).
Wang et al., "Double-spherically bent crystal high-resolution X-ray spectroscopy of spatially extended sources," Chinese Optics Lett., vol. 18(6), 061101 (2020).
Yamada et al., "Compact full-field hard x-ray microscope based on advanced Kirkpatrick-Baez mirrors," Optica, vol. 7, No. 4 pp. 367-370 (2020).

(56) References Cited

OTHER PUBLICATIONS

Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).

Buchanan et al., "Effective modelling of high-energy laboratory-based x-ray phase contrast imaging utilising absorption masks or gratings," J. Appl. Physics (accepted) (2020).

Datta et al., "A new generation of direct X-ray detectors for medical and synchrotron imaging applications," Sci. Reports, vol. 10, p. 20097 (2020).

Graetz et al., "Lenseless C-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.

Redus et al., "Spectrometer configuration and measurement uncertainty in X-ray spectroscopy," X-Ray Spectrom., pp. 1-14 (2020).

Shi et al., "Towards the Fabrication of High-Aspect-Ratio Silicon Gratings by Deep Reactive Ion Etching," Micromachines, vol. 11, p. 864, 13 pages (2020).

Takeo et al., "A highly efficient nanofocusing system for soft x rays," Appl. Phys. Lett., vol. 117, 151104 (2020).

Yang et al., "Comperative stucy of single-layer, bilayer, and trilayer mirrors with enhanced x-ray reflectance in 0.5- to 80keV energy region," J. Astron. Telesc. Instrum. Syst., vol. 6(4) 044001, 12 pages (2020).

\* cited by examiner

WAVELENGTH DISPERSIVE X-RAY SPECTROMETER

CLAIM OF PRIORITY

The present application claims the benefit of priority to U.S. Provisional Appl. No. 62/680,451, filed Jun. 4, 2018 and U.S. Provisional Appl. No. 62/680,795 filed Jun. 5, 2018, each of which is incorporated in its entirety by reference herein.

BACKGROUND

Field

The present application relates generally to x-ray spectrometers.

Description of the Related Art

X-ray fluorescence (XRF) can be the result of elastic or inelastic scattering, or the transition between energy levels in a target bombarded by x-rays, electrons, or other particles. Details of the XRF spectrum can provide chemical composition information and insight into the electronic structure and/or the chemical state of the target material. XRF spectra are often analyzed by comparison with theoretical calculations, or by comparison with known x-ray emission spectra from model materials. XRF spectra are typically emitted over a wide angular range, so the x-ray spectrometer can have a wide angular acceptance to receive a larger fraction of the emission x-rays to speed data collection.

X-ray spectrometers have previously been developed for various related techniques. X-ray spectroscopy includes the techniques of energy dispersive spectroscopy (EDS) in which the energies of the emitted x-rays are analyzed using an energy dispersive solid state detector, and wavelength dispersive spectroscopy (WDS) in which the emitted x-rays are analyzed using either crystals or diffraction gratings to disperse the emitted x-rays and at least one x-ray detector (e.g., linear or area detectors) is used to record the x-ray emission spectrum. WDS generally provides higher energy resolution than does EDS, and the spectrum in WDS is often collected in series, one wavelength (or energy) at a time, making this technique more time consuming.

SUMMARY

In one aspect disclosed herein, an x-ray spectrometer is provided, the x-ray spectrometer comprising at least one x-ray optic configured to receive x-rays having an incident intensity distribution as a function of x-ray energy and at least one x-ray detector configured to receive x-rays from the at least one x-ray optic and to record a spatial distribution of the x-rays from the at least one x-ray optic. The at least one x-ray optic comprises at least one substrate comprising at least one surface extending at least partially around and along a longitudinal axis. A distance between the at least one surface and the longitudinal axis in at least one cross-sectional plane parallel to the longitudinal axis varies as a function of position along the longitudinal axis. The at least one x-ray optic further comprises at least one mosaic crystal structure and/or a plurality of layers on or over at least a portion of the at least one surface. The plurality of layers comprises a first plurality of first layers comprising a first material and a second plurality of second layers comprising a second material. The first layers and the second layers alternate with one another in a direction perpendicular to the at least one surface.

In another aspect disclosed herein, an x-ray spectrometer is provided, the x-ray spectrometer comprising a multilayer stack configured to receive x-rays having an incident intensity distribution as a function of x-ray energy. The multilayer stack comprises a first plurality of first layers comprising a first material and a second plurality of second layers comprising a second material. The first layers and the second layers alternate with one another. A first portion of the multilayer stack is configured to direct a first portion of the received x-rays and a second portion of the multilayer stack is configured to direct a second portion of the received x-rays, the second portion of the multilayer stack laterally displaced from the first portion of the multilayer stack. The directed first portion of the received x-rays have a first intensity distribution as a function of x-ray energy and the directed second portion of the received x-rays have a second intensity distribution as a function of x-ray energy, the second intensity distribution different from the first intensity distribution. The x-ray spectrometer further comprises at least one x-ray detector configured to receive the directed first portion and the directed second portion of the received x-rays from the at least one x-ray optic and to record a spatial distribution of the directed first portion and the directed second portion of the received x-rays from the multilayer stack.

In another aspect disclosed herein, an x-ray spectrometer is provided, the x-ray spectrometer comprising at least one x-ray optic configured to receive x-rays having a spectral bandwidth greater than 100 eV. The at least one x-ray optic comprises at least one surface extending at least partially around and along a longitudinal axis and a plurality of layers on or over at least a portion of the at least one surface. The at least one x-ray optic is configured to diffract and cause spatial separation of the received x-rays as a function of x-ray energy for at least a portion of the spectral bandwidth of the received x-rays according to the Bragg relation. The x-ray spectrometer further comprises at least one x-ray detector configured to record a spatial distribution of at least some of the x-rays diffracted by the at least one x-ray optic.

DETAILED DESCRIPTION

Certain embodiments described herein provide a wavelength dispersive x-ray spectrometer with parallel detection of x-rays of different wavelengths. In certain such embodiments, the x-ray spectrometer is configured to simultaneously record an entire x-ray spectrum, or a spectral segment comprising a range of x-ray energies, of the x-rays received by the x-ray spectrometer.

Figure 1A:
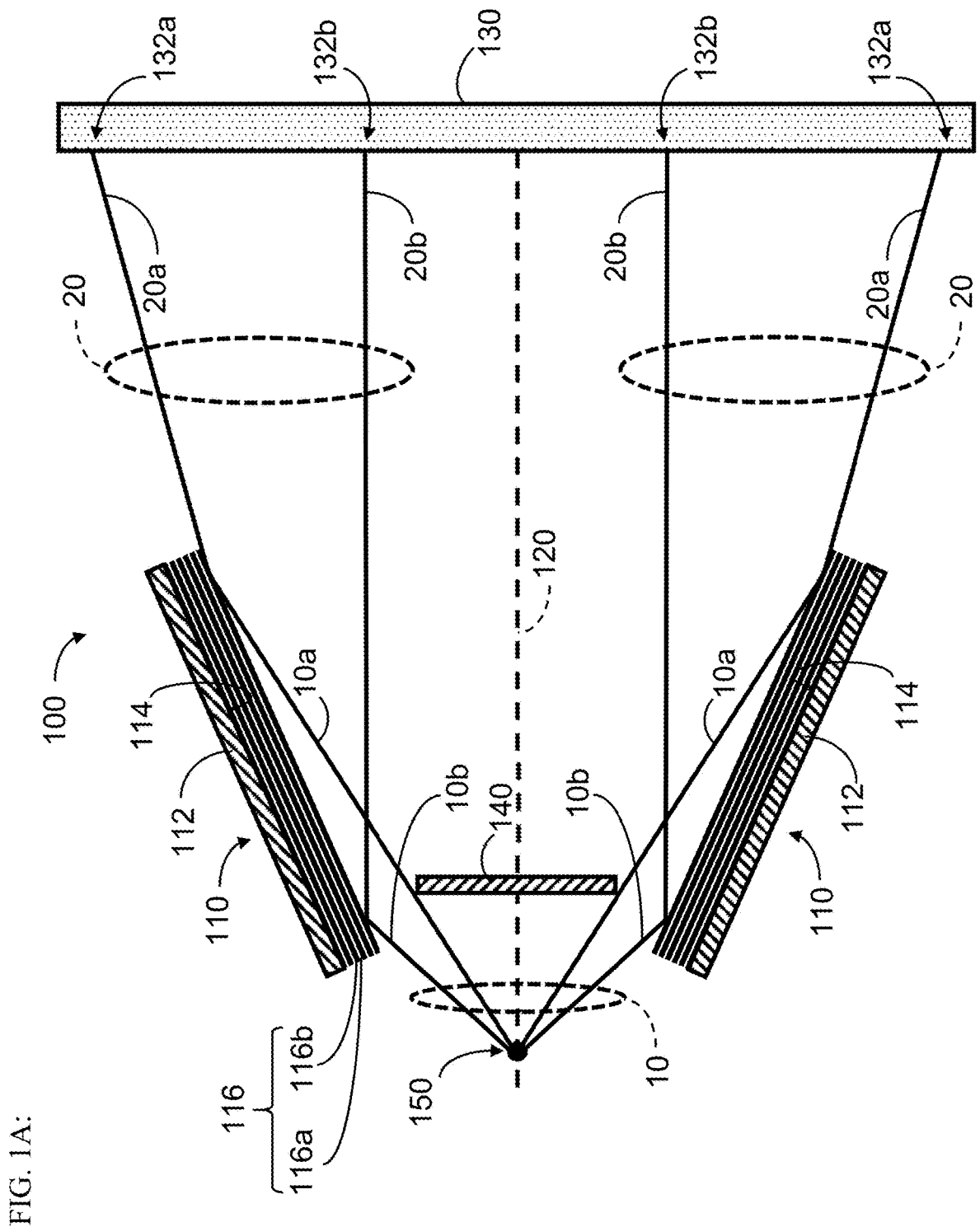
FIGS. 1A-1C schematically illustrate cross-sectional views of various configurations of an example x-ray spectrometer in accordance with certain embodiments described herein.
Figure 1B:
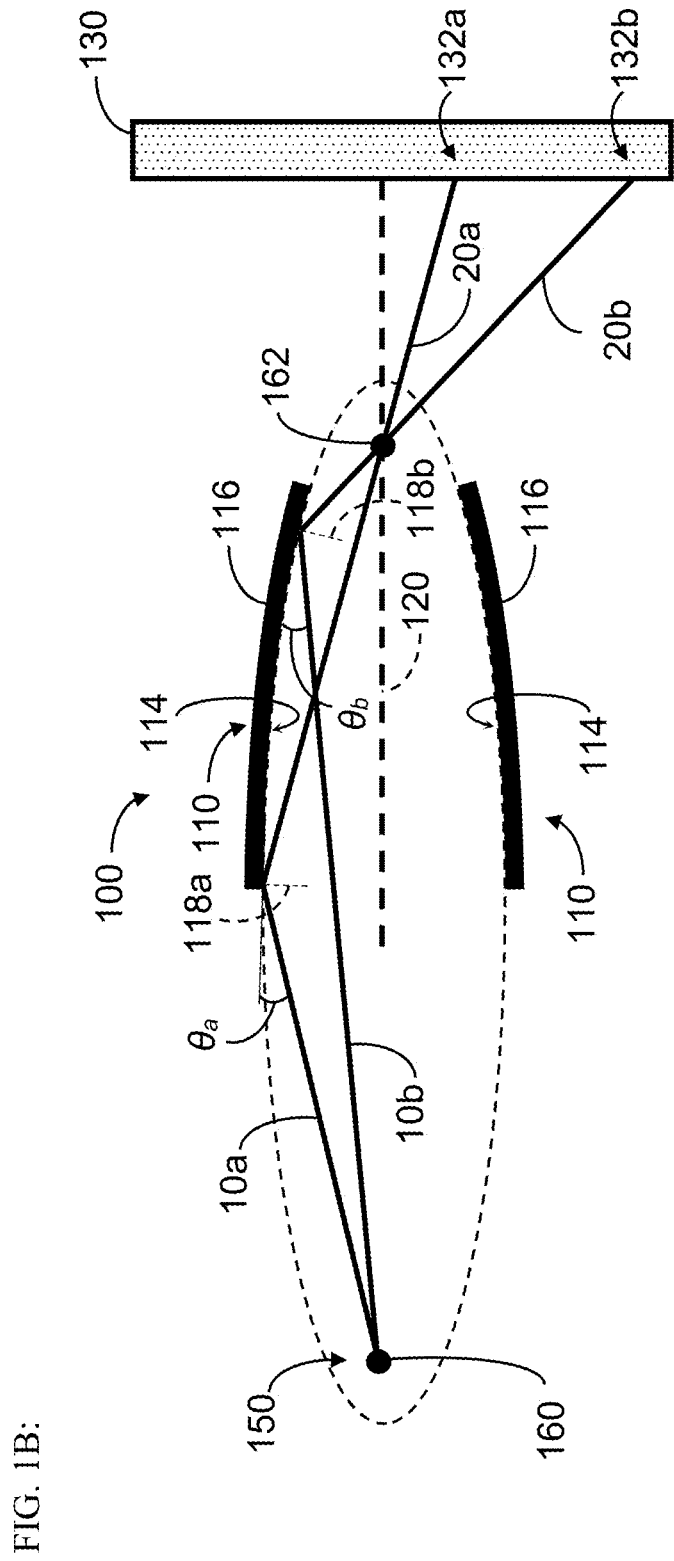
Figure 1C:
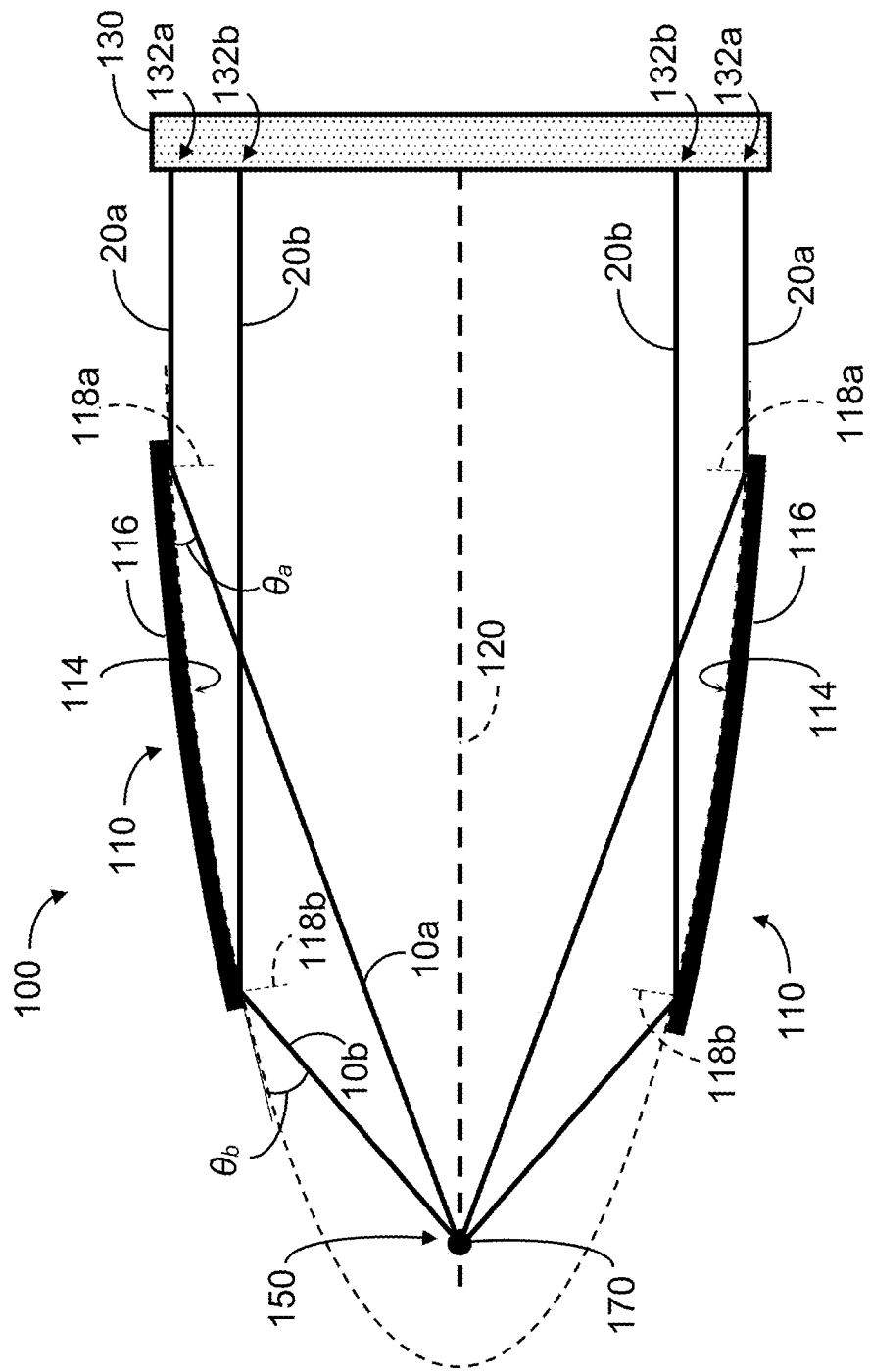

FIGS. 1A-1C schematically illustrate cross-sectional views of various configurations of an example x-ray spectrometer 100 in accordance with certain embodiments described herein. As schematically illustrated by FIG. 1A, the x-ray spectrometer 100 comprises at least one x-ray optic 110 configured to receive x-rays 10 having an incident intensity distribution as a function of x-ray energy (e.g., an incident x-ray energy spectrum). The at least one x-ray optic 110 comprises at least one substrate 112 comprising at least one surface 114 extending at least partially around and along a longitudinal axis 120. A distance between the at least one surface 114 and the longitudinal axis 120 in at least one cross-sectional plane parallel to the longitudinal axis 120 varies as a function of position along the longitudinal axis 120. The at least one x-ray optic 110 further comprises at least one mosaic crystal structure and/or a plurality of layers 116 on or over at least a portion of the at least one surface 114. The plurality of layers 116 comprising a first plurality of first layers 116a comprising a first material and a second plurality of second layers 116b comprising a second material, the first layers 116a and the second layers 116b alternating with one another in a direction perpendicular to the at least one surface 114. The x-ray spectrometer 100 further comprises at least one x-ray detector 130 configured to receive x-rays 20 from (e.g., reflected by; diffracted by) the at least one x-ray optic 110 and to record a spatial distribution of the x-rays 20 from the at least one x-ray optic 110. The cross-sectional views of FIGS. 1A-1C are in a cross-sectional plane that is parallel to the longitudinal axis 120 (e.g., the cross-sectional plane includes the longitudinal axis 120).

In certain embodiments, the at least one substrate 112 (e.g., comprising glass or silicon oxide) comprises a single, unitary element. For example, the substrate 112 can comprise a hollow axially symmetric structure (e.g., an axially symmetric tube) extending along the longitudinal axis 120 and the at least one surface 114 comprises an inner surface of the structure that extends fully around the longitudinal axis 120 (e.g., encircles the longitudinal axis 120; extends 360 degrees around the longitudinal axis 120). In certain other embodiments, the at least one substrate 112 comprises at least one portion of a hollow axially symmetric structure (e.g., a portion of an axially symmetric tube) extending along the longitudinal axis 120 with an inner surface that extends only partially around the longitudinal axis 120 (e.g., less than 360 degrees; in a range of 45 degrees to 360 degrees; in a range of 45 degrees to 315 degrees; in a range of 180 degrees to 360 degrees; in a range of 90 degrees to 270 degrees). In certain embodiments, the at least one substrate 112 comprises multiple substrate portions (e.g., 2, 3, 4, 5, 6, or more) separate from one another (e.g., with spaces between the substrate portions) and distributed around the longitudinal axis 120, with the surface 114 of each substrate portion extending at least partially around and along the longitudinal axis 120. For example, the surfaces 114 of the multiple substrate portions can each extend around the longitudinal axis 120 by an angle in a range of 15 degrees to 175 degrees, in a range of 30 degrees to 115 degrees, and/or in a range of 45 degrees to 85 degrees.

In certain embodiments, a distance between the at least one surface 114 and the longitudinal axis 120 (e.g., in a cross-sectional plane parallel to and including the longitudinal axis 120) varies as a function of position along the longitudinal axis 120. For example, the surface 114 can comprise an inner surface of a hollow axially symmetric structure (e.g., tube) having an inner diameter which varies as a function of position along the longitudinal axis 120.

For example, as schematically illustrated by FIG. 1A, at least a portion of the at least one surface 114 can have a substantially straight cross-sectional profile in a plane that comprises the longitudinal axis 120, with the portion of the at least one surface 114 having a first inner diameter at a first position along the longitudinal axis 120 and having a second inner diameter at a second position along the longitudinal axis 120, the second inner diameter smaller than the first inner diameter (e.g., the at least one x-ray optic 110 can be tapered or cone-shaped).

For another example, the at least one surface 114 can be curved in at least one cross-sectional plane parallel to the longitudinal axis 120 (e.g., in a cross-sectional plane that includes the longitudinal axis 120). In certain such embodiments, the at least one surface 114 is concave and a surface normal 118 of the at least one surface 114 (e.g., in a direction perpendicular to the at least one surface 114) is different at different locations along the at least one surface 114 (e.g., different locations spaced from one another in a direction along the longitudinal axis 120 in the cross-sectional plane parallel to the longitudinal axis 120). For example, as schematically illustrated by FIGS. 1B and 1C, a first portion of the at least one surface 114 has a first surface normal 118a and a second portion of the at least one surface 114 has a second surface normal 118b. As described herein, the x-rays 20 from the at least one mosaic crystal structure and/or the plurality of layers 116 on the first, second, and third portions of the at least one surface 114 (e.g., x-rays 20a, 20b, 20c) have different spectral characteristics and propagate in different directions, as schematically illustrated by FIG. 1A).

In certain embodiments, the at least one surface 114 has a first linear dimension (e.g., length) parallel to the longitudinal axis 120 in a range of 3 mm to 150 mm, a second linear dimension (e.g., width) perpendicular to the first linear dimension in a range of 1 mm to 50 mm, and a maximum linear dimension (e.g., an inner diameter; a maximum length of a straight line segment joining two points on the surface 114) in a range of 1 mm to 50 mm in a plane perpendicular to the longitudinal axis 120, a surface roughness in a range of 0.1 nm to 1 nm, and/or a plurality of surface tangent planes having a range of angles relative to the longitudinal axis 120 in a range of 0.01 radian to 0.5 radian (e.g., in a range of 0.01 radian to 0.4 radian; in a range of 0.01 radian to 0.3 radian).

In certain embodiments, the at least one surface 114 is concave and at least a portion of the surface 114 has a portion of a quadric profile in a cross-sectional plane that comprises the longitudinal axis 120. In certain embodiments, the at least one surface 114 comprises multiple portions having cross-sectional profiles (e.g., in a cross-sectional plane that comprises the longitudinal axis 120) comprising corresponding quadric profiles. Examples of quadric profiles compatible with certain embodiments described herein include, but are not limited to: at least one ellipsoid; at least one paraboloid; at least one hyperboloid; or a combination of two or more thereof.

For example, FIG. 1B schematically illustrates a cross-sectional view of an example x-ray spectrometer 100 in which the surface 114 has a portion of an ellipsoidal profile in a cross-sectional plane comprising the longitudinal axis 120 in accordance with certain embodiments described herein. As schematically illustrated by FIG. 1B, the x-ray source 150 (e.g., a sample emitting fluorescence x-rays) is positioned at a first focus 160 of the ellipsoidal profile and the x-rays 20 from the surface 114 comprise a convergent x-ray beam directed towards a second focus 162 of the ellipsoidal profile and received by the at least one x-ray detector 130 positioned away from the second focus 162. In certain such embodiments, the x-ray spectrometer 100 can further comprise an aperture (not shown) placed between the at least one surface 114 and the at least one x-ray detector 130 (e.g., at or near the second focus 162). The aperture can have a dimension that is between 20% and 300% of the beam size of the x-ray beam at the position of the aperture. For another example, FIG. 1C schematically illustrates a cross-sectional view of an example x-ray spectrometer 100 in which the surface 114 has a portion of a paraboloidal profile in a cross-sectional plane comprising the longitudinal axis 120 in accordance with certain embodiments described herein. As schematically illustrated by FIG. 1C, the x-ray source 150 (e.g., a sample emitting fluorescence x-rays) is positioned at the focus 170 of the paraboloidal profile and the x-rays 20 are collimated and received by the at least one x-ray detector 130.

In certain embodiments, the plurality of layers 116 on or over at least a portion of the at least one surface 114 comprises a plurality of synthetic multilayers (e.g., a multilayer stack; a stack of layers 116a, 116b that have been sequentially deposited onto the surface 114 and one another, the layers 116a, 116b having selected materials and selected thicknesses). In certain embodiments, the first layers 116a and/or the second layers 116b are formed by at least one of: atomic layer deposition (ALD), chemical-vapor deposition (CVD), sputtering, or a combination of two or more thereof.

Each of the plurality of layers 116 of certain embodiments has a thickness in a range of 0.3 nm to 9 nm (e.g., in a range of 0.3 nm to 6 nm) and the total thickness of the plurality of layers 116 of certain embodiments is less than 1000 nm (e.g., less than 400 nm). For example, the plurality of layers 116 can comprise a number of layers that is greater than 10 and less than 100,000, greater than 10 and less than 10,000, and/or greater than 10 and less than 500 (e.g., the number of first layers 116a is greater than 5 and less than 50,000, greater than 5 and less than 5,000, and/or greater than 5 and less than 250; the number of second layers 116b is greater than 5 and less than 50,000, greater than 5 and less than 5,000, and/or greater than 5 and less than 250).

In certain embodiments, the plurality of layers 116 are arranged in multiple groups (e.g., pairs) of layers adjacent to and overlaying one another, with the period of the multilayer stack (e.g., distance between equivalent positions of two adjacent groups) in a range of 1 nm to 20 nm (e.g., in a range of 1 nm to 9 nm). In certain embodiments, the thicknesses of the layers within a group of layers are the same as one another, while in certain other embodiments, the thicknesses of the layers within a group of layers differ from one another.

For example, for a periodic plurality of layers 116 comprising pairs of layers 116a, 116b overlaying one another (e.g., a multilayer stack), each of the first layers 116a can have a first thickness ($d_1$), each of the second layers 116b can have a second thickness ($d_2$), and the first layers 116a and the second layers 116b can alternate with one another with a periodicity (e.g., in a direction along the surface normal 118 of the at least one surface 114). The period of the multilayer stack can equal the sum of the layer 116a thickness ($d_1$) and the layer 116b thickness ($d_2$). The thicknesses of the layers 116a, 116b can be the same as one another (e.g., $d_1=d_2$) or the thicknesses of the layers 116a can differ from one another (e.g., $d_1/d_2$ in a range of 0.1 to 3, in a range of 0.1 to 0.9, or in a range of 0.2 to 0.9).

In certain embodiments, the periodicity does not change throughout the plurality of layers 116, while in certain other embodiments, the periodicity does change along at least one direction. For example, the plurality of layers 116 of certain embodiments is graded with varying d-spacings (e.g., multilayer stack periods) in a direction perpendicular to the at least one surface 114 (e.g., a direction along the surface normal 118 of the at least one surface 114)(e.g., the plurality of layers 116 is depth graded). The plurality of layers 116 of certain other embodiments is graded with varying d-spacings (e.g., multilayer stack periods) along a direction parallel to the surface 114 (e.g., a direction generally along the longitudinal axis; a direction perpendicular to the surface normal 118 of the surface 114)(e.g., the plurality of layers 116 is laterally graded).

In certain embodiments, the first material of the first layers 116a comprises a first element having a first atomic number (e.g., a low-Z element with atomic number less than or equal to 15) and a first electron density and the second material of the second layers 116b comprises a second element having a second atomic number (e.g., a high-Z element with atomic number greater than or equal to 14) and a second electron density, the second atomic number greater than the first atomic number and/or the second electron density greater than the first electron density. Examples of the first element include but are not limited to: silicon, boron, and carbon. Examples of the second element include but are not limited to: chromium, molybdenum, and platinum. In certain embodiments, a mass density differential between the first material and the second material is greater than or equal to 1 $g/cm^3$.

In certain embodiments, the at least one mosaic crystal structure comprises one or more mosaic graphite crystal structures, including but not limited to, highly oriented pyrolytic graphite (HOPG), highly annealed pyrolytic graphite (HAPG), or a combination thereof. In certain embodiments, the at least one mosaic crystal structure has a thickness in a range of 5 microns to 100 microns (e.g., 10 microns to 100 microns) and has a mosaicity (e.g., mosaic spread) in a range of 0.05 degree to 1 degree (e.g., 0.1 degree to 1 degree).

In certain embodiments, at least one mosaic crystal structure and/or the plurality of layers 116 is configured to provide x-ray spectra having a predetermined intensity distribution as a function of x-ray energy by causing spectral modification of the received x-rays 10 incident on and directed by the at least one x-ray optic 110, and the spectral modification is dependent on the location along the at least one x-ray optic 110 at which the received x-rays 10 are incident to the at least one x-ray optic 110. For example, as schematically illustrated by FIG. 1A, at least a first portion 10a of the received x-rays 10 impinge a first portion of the x-ray optic 110 at a first set of locations and the x-rays 20a propagate in a corresponding one or more directions and impinge the at least one x-ray detector 130 at a corresponding one or more positions 132a. In addition, at least a second portion 10b of the received x-rays 10 impinge a second portion of the x-ray optic 110 at a second set of locations and the x-rays 20b propagate in a corresponding one or more directions and impinge the at least one x-ray detector 130 at a corresponding one or more positions 132b.

Figure 1D:
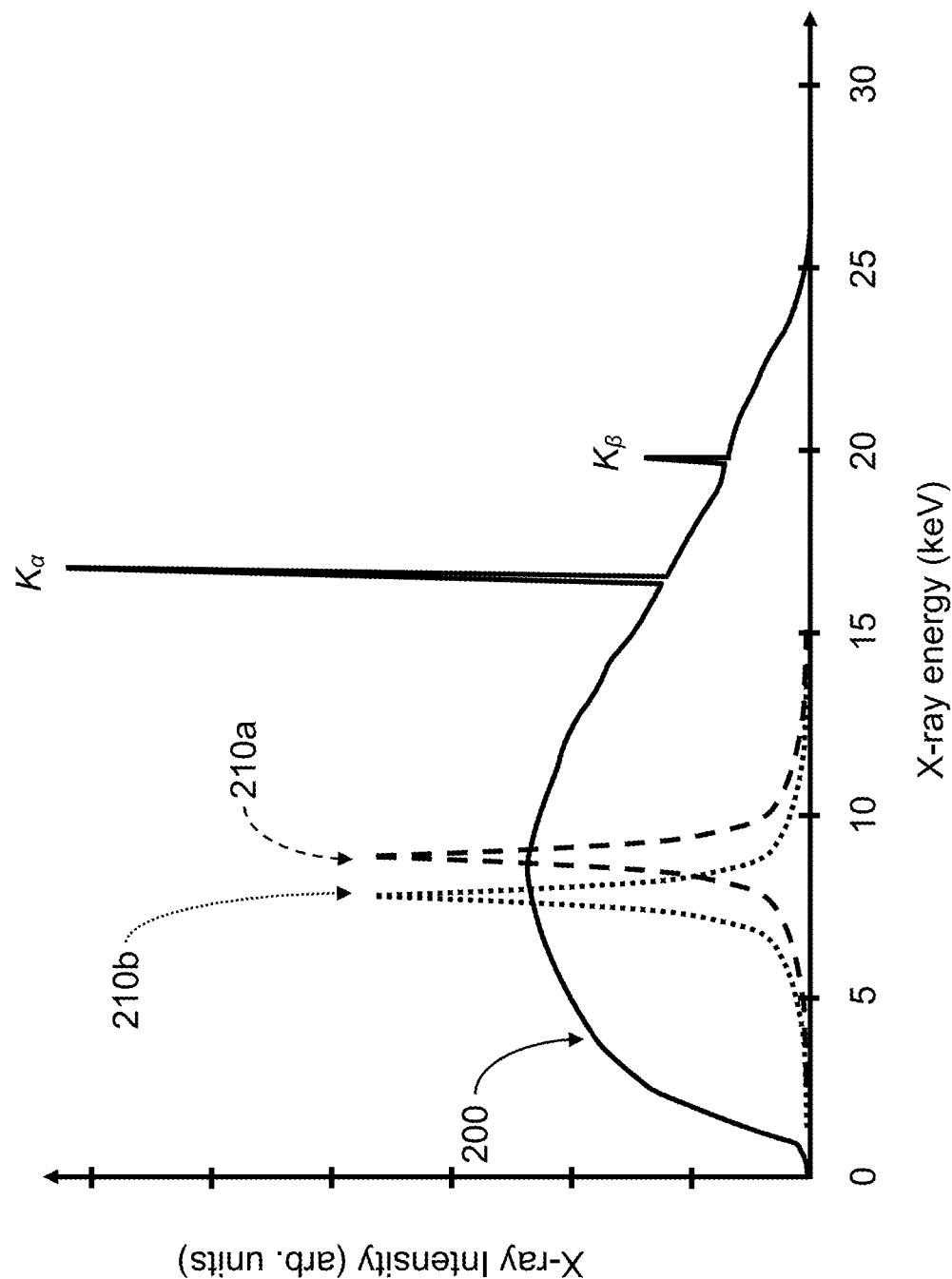
FIG. 1D schematically illustrates an example x-ray spectrum of the received x-rays and two example x-ray spectra for x-rays from an x-ray optic in accordance with certain embodiments described herein.

FIG. 1D schematically illustrates an example x-ray spectrum 200 (solid line) of the received x-rays 10 incident to the at least one x-ray optic 110 of the example x-ray spectrometer 100 of FIGS. 1A-1C in accordance with certain embodiments described herein. FIG. 1D also schematically illustrates an example first x-ray spectrum 210a (dashed line) for the x-rays 20 from a first location along the at least one x-ray optic 110 and an example second x-ray spectrum 210b (dotted line) for the x-rays 20 from a second location along the at least one x-ray optic 110. The first and second locations are displaced from one another in a direction along the longitudinal axis 120. The two x-ray spectra 210a, 210b are not shown to scale in FIG. 1D, either to the x-ray spectrum 200 or to one another. In certain embodiments, the two peaks of the two x-ray spectra 210a, 210b are within 1 keV of one another. While FIG. 1D schematically illustrates two example x-ray spectra 210a, 210b for x-rays 20 from two different locations along the at least one x-ray optic 110, there is a continuous shift of the energy of the x-ray spectrum 210 as the location from which the x-rays 20 are directed from shifts along the at least one x-ray optic 110.

The incident x-ray spectrum 200 has an incident intensity distribution as a function of x-ray energy, and each of the first and second x-ray spectra 210a, 210b has a corresponding first and second intensity distribution, respectively, as a function of x-ray energy, wherein each of the first and second intensity distributions is different from the incident intensity distribution and from one another. For example, as shown schematically in FIG. 1D, the example incident x-ray spectrum 200 of the incident received x-rays 10 (e.g., corresponding to the emitted x-rays from an electron-bombarded x-ray target) has substantial intensity values across a broad range of x-ray energies (e.g., in a range of 0.5 keV to 25 keV), as well as characteristic $K_\alpha$ and $K_\beta$ emission lines, while each of the example first and second x-ray spectra 210a, 210b of the x-rays 20 has a peak with a substantial intensity value at a particular corresponding x-ray energy and much lower intensity values at other x-ray energies. In certain embodiments, the energy bandwidth of the x-rays 20 is in a range of 100 eV to 5 keV.

For example, the at least one x-ray optic 110 schematically illustrated in FIG. 1B has a portion of the at least one surface 114 that has a cross-sectional profile corresponding to a portion of an ellipsoid. In certain embodiments, at least some of the x-rays emitted from the x-ray source 150 (e.g., point source; emitter of fluorescence x-rays; a diverging x-ray source) are incident on the at least one x-ray optic 110 (e.g., the received x-rays 10) and have a range of x-ray energies and an isotropic spatial distribution. As shown in FIG. 1B, the received x-rays 10a, 10b are incident to corresponding portions of the at least one x-ray optic 110 at angles $\theta_a$ and $\theta_b$, respectively, relative to a plane perpendicular to the surface normal 118a, 118b of the portions of the surface 114 underlying the corresponding portions of the plurality of layers 116. The at least one mosaic crystal structure and/or the plurality of layers 116 is configured such that high reflectivity is obtained (e.g., diffraction conditions are satisfied) when the Bragg relation (2d sin $\theta=n\lambda$) is satisfied, where d is the period of the at least one mosaic crystal structure or the plurality of layers 116, $\theta$ is the angle, $\lambda$ is the x-ray wavelength, and n is an integer (e.g., 1, 2, . . . ). In the example embodiment of FIG. 1B, the wavelength of the x-rays 20a is shorter than the wavelength of the x-rays 20b (e.g., which are from a position that is downstream from the position from which the x-rays 20a are directed), and correspondingly, the energy of the x-rays 20a is higher than the energy of the x-rays 20b. Downstream of the second focus 162 of the ellipsoidal profile, the x-rays 20a and 20b are spatially distinct from one another. Placement of at least one x-ray detector 130 having sufficient spatial resolution at a position that is downstream of the focal spot 162 enables spectroscopy of the x-rays 20 received from the at least one x-ray optic 110.

For another example, the at least one x-ray optic 110 schematically illustrated in FIG. 1C has the at least one mosaic crystal structure and/or the plurality of layers 116 on a portion of the at least one surface 114 that has a cross-sectional profile corresponding to a portion of a paraboloid. In this embodiment, the received x-rays 10 (e.g., emitted by a point source or emitter of fluorescence x-rays; a diverging x-ray source) are directed by the at least one x-ray optic 110 and the x-rays 20 are collimated to be parallel to the longitudinal axis 120. Directed x-rays 20a with higher energies and with smaller deflection angles are farther from the longitudinal axis 120, while directed x-rays 20b (e.g., which are from a position that is upstream from the position from which the x-rays 20a are directed) with lower energies and larger deflection angles are closer to the longitudinal axis 120. The x-rays 20a and 20b are spatially distinct from one another, and placement of an x-ray detector 130 having sufficient spatial resolution at a downstream from the at least one x-ray optic 110 enables spectroscopy of the x-rays from the at least one x-ray optic 110. For yet another example, for the at least one x-ray optic 110 schematically illustrated by FIG. 1A has the at least one mosaic crystal structure and/or the plurality of layers 116 on a portion of the at least one surface 114 that has a substantially straight cross-sectional profile in a plane that comprises the longitudinal axis 120. In this embodiment, the energy of the x-rays 20a is higher than the energy of the x-rays 20b and the x-rays 20a impinge the at least one x-ray detector 130 at positions 132a that are farther from the longitudinal axis 120 than are the positions 132b at which the x-rays 20b impinge the at least one x-ray detector 130.

In certain embodiments, the at least one x-ray detector 130 comprises a pixel array x-ray detector configured to record a spatial distribution of at least a portion of the x-rays 20 received from the at least one x-ray optic 110. For example, the pixel array x-ray detector can be one-dimensional (e.g., extending along one dimension; extending along one direction perpendicular to the longitudinal axis 120) or can be two-dimensional (e.g., extending along two orthogonal dimensions; extending along two directions that are perpendicular to one another and to the longitudinal axis 120), with pixel sizes in a range of 1 micron to 200 microns (e.g., in a range of 2 microns to 200 microns; in a range of 3 microns to 200 microns). Example x-ray detectors 130 compatible with certain embodiments described herein include but are not limited to: direct-detection charge-coupled-device (CCD) detector, complementary metal-oxide-semiconductor (CMOS) detector, energy-resolving x-ray detector, indirect conversion detector comprising an x-ray scintillator, a photon counting detector.

In certain embodiments, an energy resolution of the x-ray spectrometer 100 is dependent at least in part on the spatial displacements of the positions 132 at which the x-rays 20 impinge the at least one x-ray detector 130 and on the sizes of the pixels of the pixel array x-ray detector 130. These spatial displacements of the positions 132 are related to the energies of the x-rays 10 by the Bragg relation (2d sin $\theta=n\lambda=nhc/E$) which relates the different angles $\theta$ of the incident x-rays 10 (e.g., due to the curvature of the at least one surface 114) and the d-spacings of the at least one mosaic crystal structure (e.g., distance between adjacent atomic layers within the mosaic graphite crystal structures) and/or the plurality of layers 116 (e.g., multilayer stack period) to the x-ray wavelength A and the x-ray energy E. For example, as schematically illustrated in FIGS. 1A-1C, the range of grazing angles for the incident x-rays 10 incident across the at least one x-ray optic 110 results in a range of trajectories of the x-rays 20 which impinge the at least one x-ray detector 130 across a range of positions 132. Thus, the spatial resolution of the at least one x-ray detector 130 (e.g., the sizes of the pixels) equates to an energy resolution of the x-ray spectrometer 100 (e.g., smaller pixels each are impinged by x-rays 20 within a smaller range of energies while larger pixels each are impinged by x-rays 20 within a larger range of energies). In certain embodiments, the spacings among the plurality of layers (e.g., d-spacings), the curvature of the at least one surface 114, the distance between the at least one x-ray optic 110 and the at least one x-ray detector 130, and/or the spatial resolution of the x-ray detector 130 (e.g., the pixel sizes) are selected to provide a predetermined energy resolution (e.g., less than 50 eV). In certain embodiments, the at least one x-ray optic 110 is configured such that different x-ray energy ranges of the x-rays 20 are directed onto corresponding different regions 132 of the at least one x-ray detector 130 such that the spatial positions of the different regions 132 correspond to (e.g., and can be used to distinguish between) x-rays within the different x-ray energy ranges. For example, the pixel size of the pixel array x-ray detector 130 and the distance between the x-ray optic 110 and the pixel array x-ray detector 130 are selected to record the x-ray spectrum dispersed by the x-ray optic 110 with sufficient energy resolution, according to the Bragg relation.

In certain embodiments, the at least one x-ray detector 130 comprises an energy-resolving x-ray detector selected from the group consisting of: a silicon drift detector, a superconductor-based colorimeter, a lithium drift Si detector, a lithium drift Ge detector, and a p-i-n diode. In addition to the dependencies of the energy resolution of the x-ray spectrometer 100 described above, the energy resolution of certain such embodiments can also be dependent at least in part on the energy resolution of each of the detector elements (e.g., pixels) of the energy-resolving x-ray detector.

In certain embodiments, the x-ray spectrometer 100 further comprises at least one beam stop 140 configured to be placed in the x-ray beam path to stop (e.g., intercept; prevent) x-rays that are propagating along the longitudinal axis 120 but that do not irradiate the plurality of layers 116 of the at least one x-ray optic 110 from reaching the at least one x-ray detector 130. The at least one beam stop 140 of certain embodiments defines a cone angle (e.g., less than 3 degrees; less than 50 mrad) centered around the longitudinal axis 120. The at least one beam stop 140 can be positioned at the exit side of the at least one x-ray optic 110 (see, e.g., FIG. 1A) and/or at the entrance side of the at least one x-ray optic 110. For example, the at least one beam stop 140 can be held in place by thin radial wires mechanically coupled to a supporting structure or by a thin membrane.

In certain embodiments, the plurality of layers 116 is formed (e.g., deposited) on a substrate 112 (e.g., comprising glass or silicon oxide) comprising at least one surface 114. In certain other embodiments, the at least one x-ray optic 110 comprises a multilayer stack (e.g., a plurality of layers 116 with alternating first layers 116a and second layers 116b) on a substrate 112 comprising a metal material (e.g., nickel). For example, one or more of the layers of the plurality of layers 116 can deposited on (e.g., over) a convex exterior surface of a metal mandrel having an exterior surface that is shaped to serve as a mandrel for deposition of a coating comprising the multilayer stack (e.g., using techniques such as ALD, chemical-vapor deposition (CVD), sputtering, etc.). For example, the exterior of the mandrel can have the desired profile of a portion of a predetermined quadric profile (e.g., paraboloid; ellipsoid; hyperboloid) and the deposited multilayer stack will have the same quadric profile. After adding sufficient material (e.g., Ni) on the deposited multilayer stack to provide sufficient stiffness, the mandrel can then be removed (e.g., etched away; cooled with liquid nitrogen to facilitate separation of the mandrel from the multilayer stack) to expose the axially symmetric multilayers as the interior surface of the x-ray optic 110. In certain such embodiments, the x-ray optic 110 may entirely be comprised of the multilayer materials.

Figure 2B:
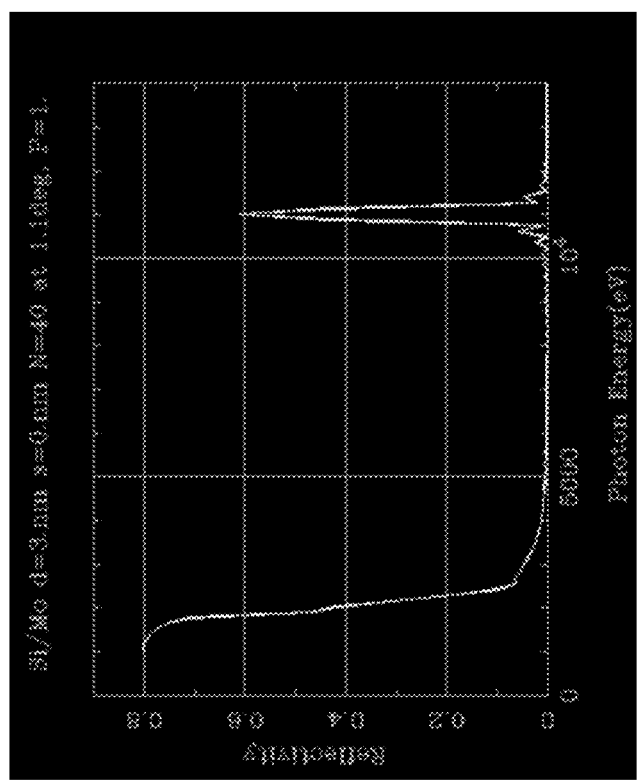
FIGS. 2A-2B, 3A-3C, 4A-4D, and 5A-5B show calculated example x-ray spectra directed by selected multilayer parameters in accordance with certain embodiments described herein.
Figure 2A:
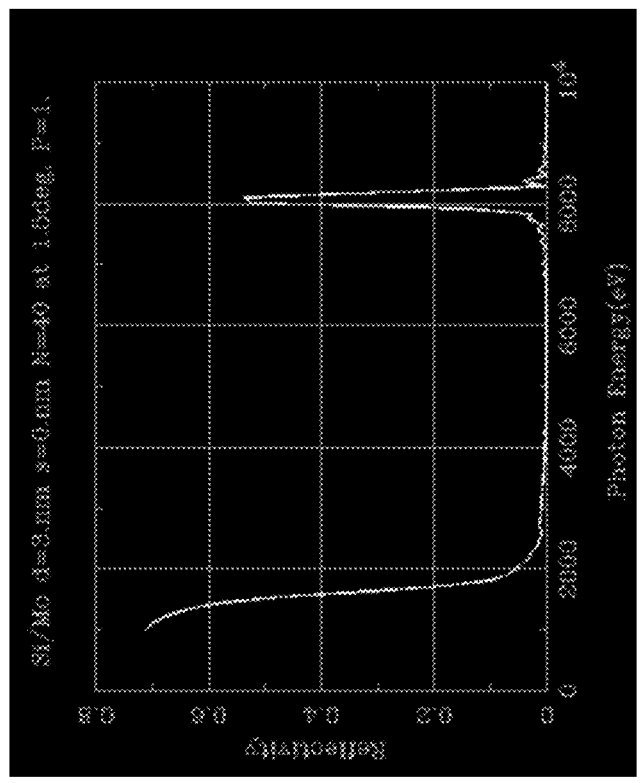
Figure 3B:
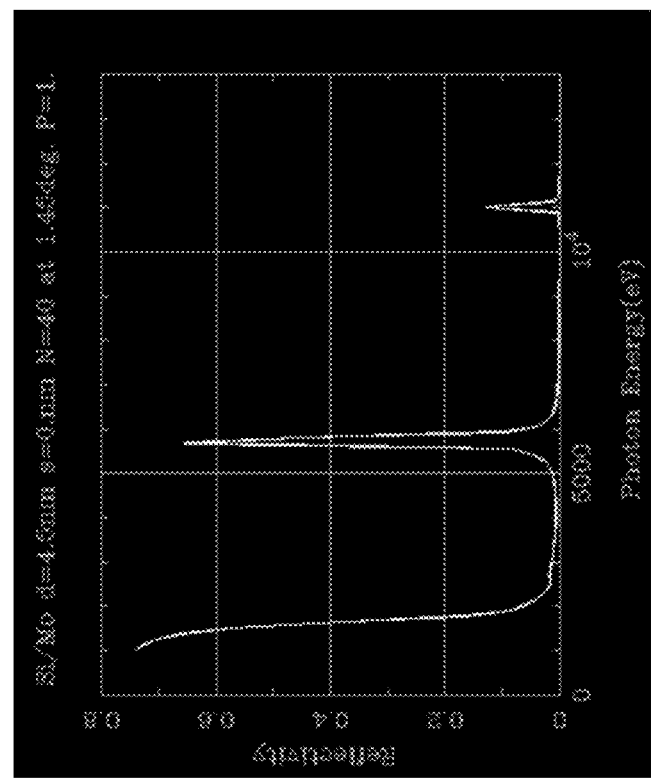
Figure 3A:
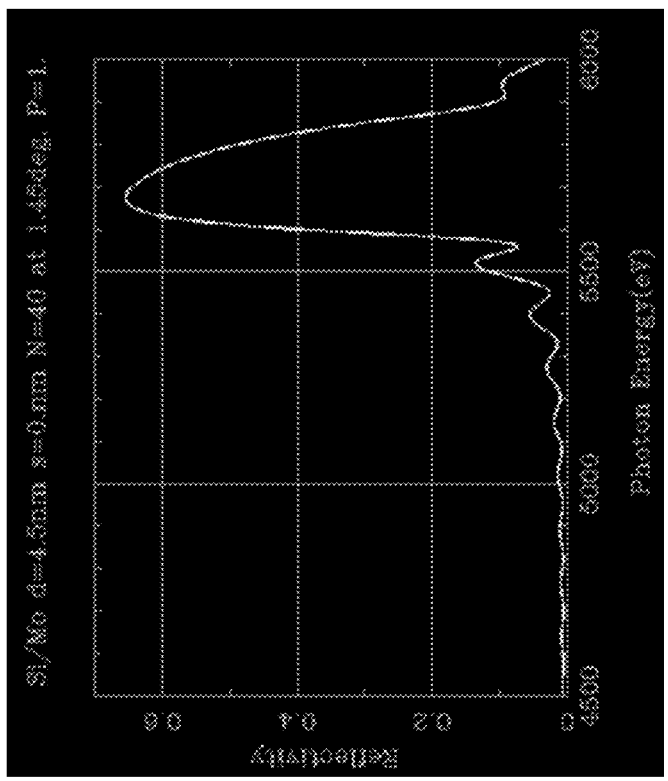
Figure 3C:
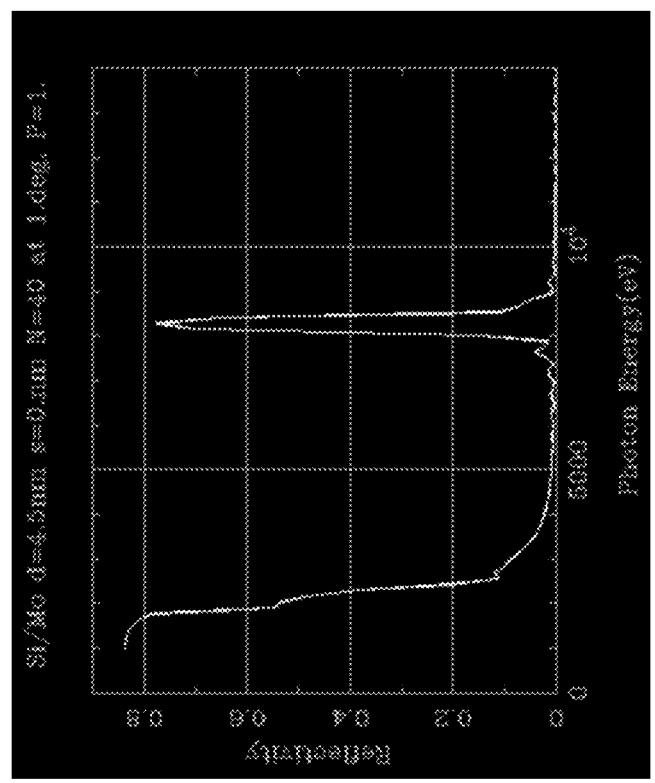
Figure 4A:
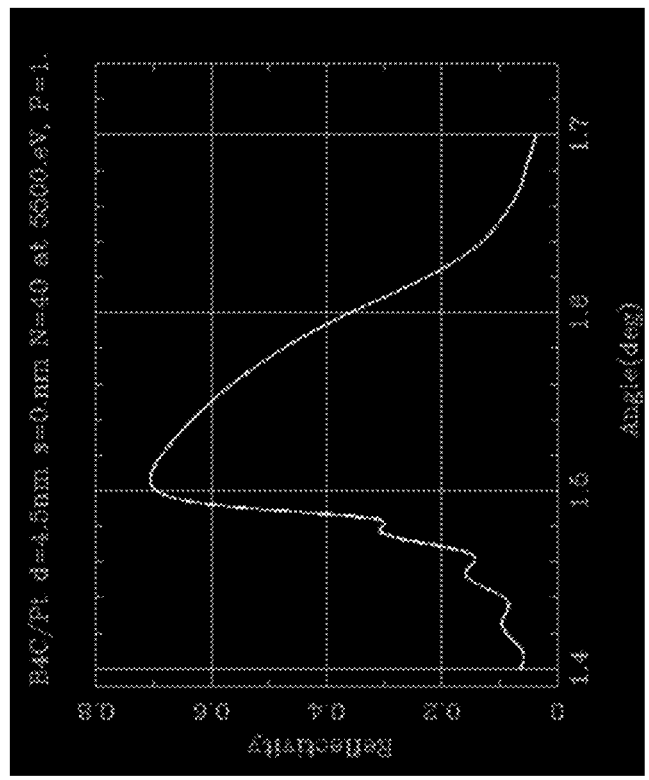
Figure 4B:
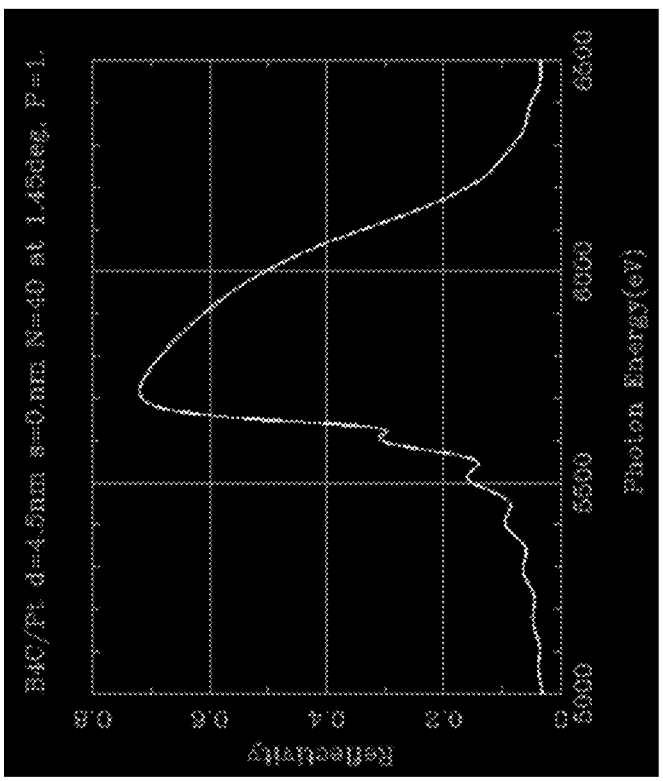
Figure 4D:
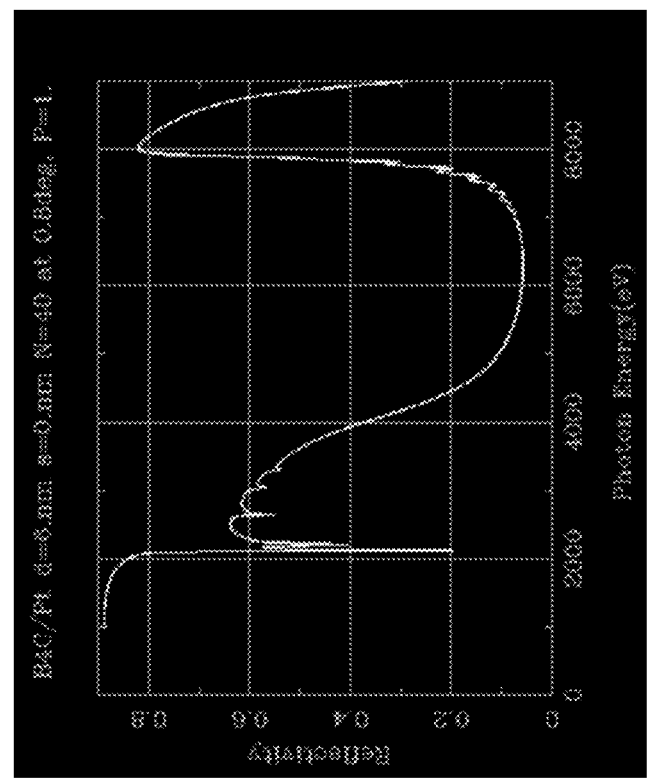
Figure 4C:
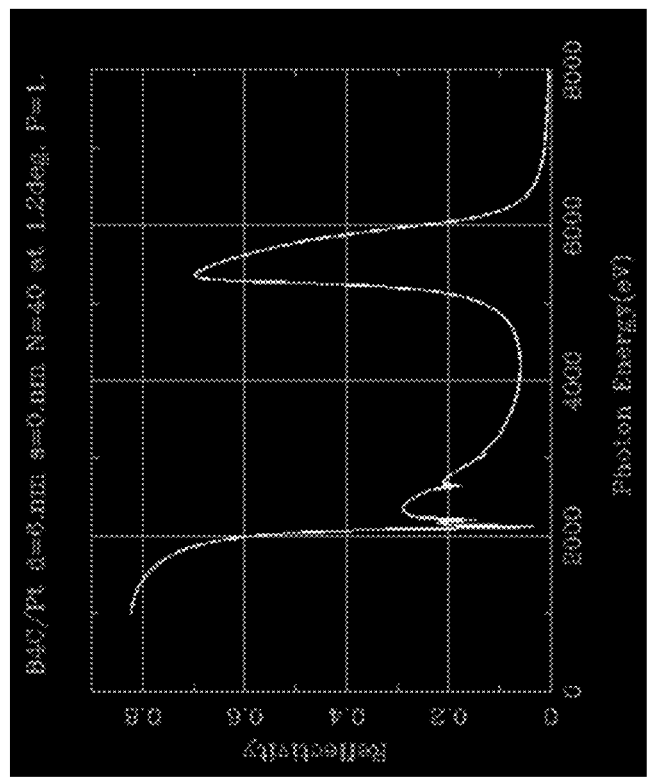
Figure 5B:
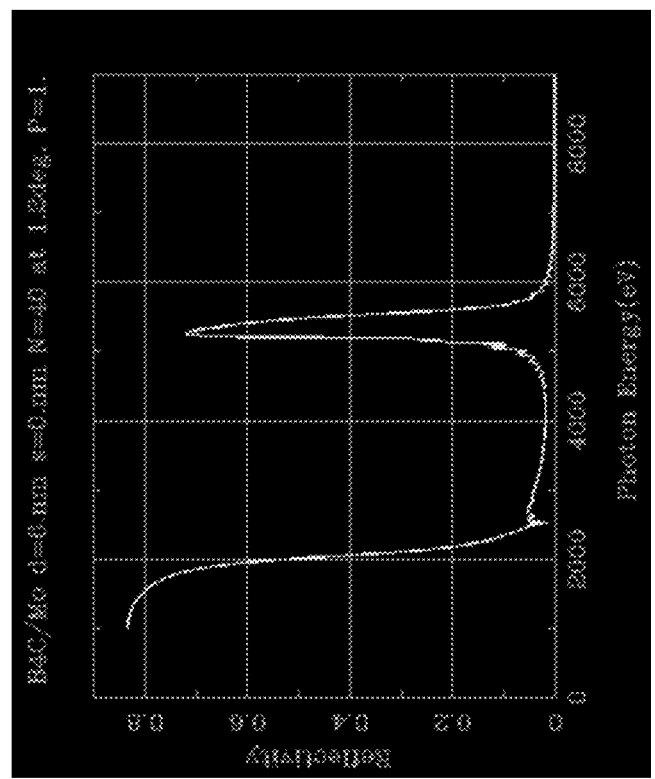
Figure 5A:
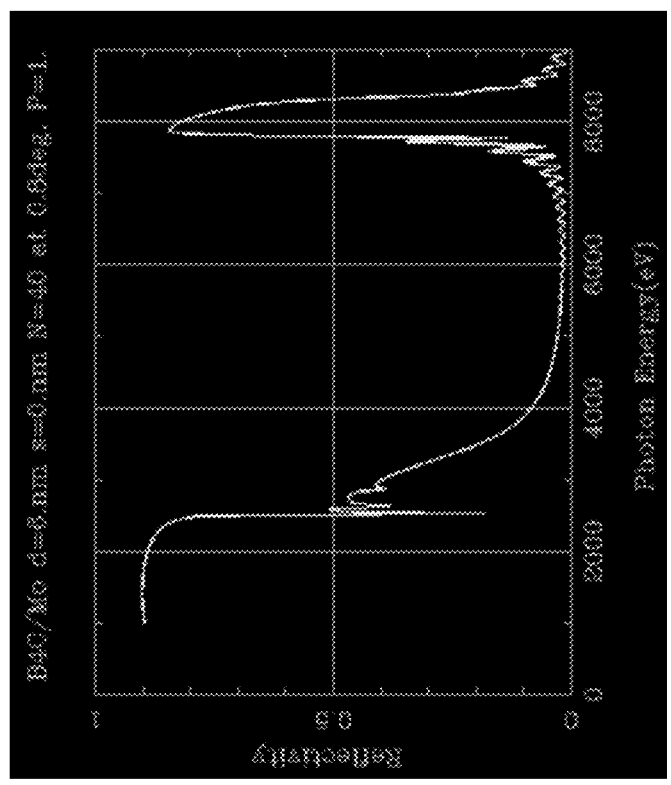

FIGS. 2A-2B, 3A-3C, 4A-4D, and 5A-5B show calculated example x-ray spectra directed by selected multilayer stack parameters in accordance with certain embodiments described herein. FIGS. 2A-2B correspond to a plurality (N=40) of silicon/molybdenum multilayers, with the multilayer stack having a period of 3 nm. FIGS. 3A-3C correspond to a plurality (N=40) of silicon/molybdenum multilayers, with the multilayer stack having a period of 4.5 nm. FIGS. 4A-4B correspond to a plurality (N=40) of boron carbide ($B_4C$)/platinum multilayers, with the multilayer stack having a period of 4.5 nm and FIGS. 4C-4D correspond to a plurality (N=40) of boron carbide ($B_4C$)/platinum multilayers, with the multilayer stack having a period of 6 nm. FIGS. 5A-5B correspond to a plurality (N=40) of boron carbide ($B_4C$)/molybdenum multilayers, with the multilayer stack having a period of 6 nm.

The following tables show calculated values of spectral coverage of various example x-ray spectrometers 100 in accordance with certain embodiments described herein. The surface 114 (e.g., mirror) of these example x-ray spectrometers 100 is ellipsoidal, which for a large source-to-optic distance (e.g., sample distance) is a close approximation to a paraboloid profile, and the calculations were made for various entrance apertures and periodic multilayer d-spacings (e.g., periods of the multilayer stacks). For each of these calculations, the ellipsoid semimajor axis is equal to one-half the source to sample distance.

TABLE 1

Example configurations

|  | Example 1 | Example 2 | Example 3 | Example 4 | Example 5 | Example 6 |
| --- | --- | --- | --- | --- | --- | --- |
| Source demagnification factor | 13000 | 20000 | 13000 | 20000 | 13000 | 20000 |
| Source to sample distance (meters) | 500 | 500 | 500 | 500 | 500 | 500 |
| Ellipsoid semiminor axis (mm) | 40 | 50 | 120 | 150 | 80 | 100 |
| Mirror length (mm) | 40 | 30 | 40 | 30 | 40 | 30 |
| Working distance (mm) | 25.1 | 15.0 | 25.1 | 15.0 | 25.1 | 15.0 |
| Entrance aperture inner diameter (mm) | 1.83 | 1.90 | 5.48 | 5.69 | 3.65 | 3.79 |
| Exit aperture inner diameter (mm) | 1.13 | 1.10 | 3.40 | 3.29 | 2.27 | 2.19 |

TABLE 1-continued

Example configurations

|  | Example 1 | Example 2 | Example 3 | Example 4 | Example 5 | Example 6 |
|---|---|---|---|---|---|---|
| Fractional loss due to exit aperture | 0.39 | 0.33 | 0.39 | 0.33 | 0.39 | 0.33 |
| Beam cross-section intercepted by lens (mm$^2$) | 1.61 | 1.88 | 14.47 | 16.95 | 6.43 | 7.54 |
| Grazing angle at mirror upstream end (mrad) | 7.01 | 10.54 | 21.03 | 31.62 | 14.02 | 21.08 |
| Grazing angle at ⅔ mirror length from upstream end (mrad) | 9.12 | 14.14 | 27.37 | 42.43 | 18.24 | 28.29 |
| Grazing angle at mirror downstream end (mrad) | 11.29 | 18.26 | 33.86 | 54.78 | 22.57 | 36.52 |

TABLE 2

Comparison of Examples 1 and 2 for various multilayer stack periods at three positions: (i) at mirror upstream end, (ii) at ⅔ mirror length from upstream end, and (iii) at mirror downstream end.

| Example 1 Minimum energy from by 3 nm multilayer period | Example 2 Minimum energy from 3 nm multilayer period | Example 1 Minimum energy from 4 nm multilayer period | Example 2 Minimum energy from 4 nm multilayer period | Example 1 Minimum energy from 6 nm multilayer period | Example 2 Minimum energy from 6 nm multilayer period |
|---|---|---|---|---|---|
| 29.48354 | 19.60614 | 22.11265 | 14.70461 | 14.74177 | 9.803072 |
| 22.65559 | 14.61281 | 16.99169 | 10.95961 | 11.32779 | 7.306405 |
| 18.31217 | 11.31896 | 13.73412 | 8.489219 | 9.156083 | 5.659479 |

TABLE 3

Comparison of Examples 3 and 4 for various multilayer stack periods at three positions: (i) at mirror upstream end, (ii) at ⅔ mirror length from upstream end, and (iii) at mirror downstream end.

| Example 3 Minimum energy from 3 nm multilayer period | Example 4 Minimum energy from 3 nm multilayer period | Example 3 Minimum energy from 4 nm multilayer period | Example 4 Minimum energy from 4 nm multilayer period | Example 3 Minimum energy from 6 nm multilayer period | Example 4 Minimum energy from 6 nm multilayer period |
|---|---|---|---|---|---|
| 9.827845 | 6.535381 | 7.370884 | 4.901536 | 4.913923 | 32.67691 |
| 7.551863 | 4.870937 | 5.663897 | 3.653202 | 3.775932 | 24.35468 |
| 6.104055 | 3.772986 | 4.578041 | 2.82974 | 3.052028 | 18.86493 |

TABLE 4

Comparison of Examples 5 and 6 for various multilayer stack periods at three positions: (i) at mirror upstream end, (ii) at ⅔ mirror length from upstream end, and (iii) at mirror downstream end.

| Example 5 Minimum energy from 3 nm multilayer period | Example 6 Minimum energy from 3 nm multilayer period | Example 5 Minimum energy from 4 nm multilayer period | Example 6 Minimum energy from 4 nm multilayer period | Example 5 Minimum energy from 6 nm multilayer period | Example 6 Minimum energy from 6 nm multilayer period |
|---|---|---|---|---|---|
| 14.74177 | 9.803072 | 11.05633 | 7.352304 | 7.370884 | 4.901536 |
| 11.32779 | 7.306405 | 8.495846 | 5.479804 | 5.663897 | 3.653202 |
| 9.156083 | 5.659479 | 6.867062 | 4.244609 | 4.578041 | 2.82974 |

In certain embodiments, the x-ray spectrometer 100 is configured to work in the 0.5 keV to 4 keV range, while in certain other embodiments, the range extends to as low as 0.2 keV and/or as high as 14 keV. Such x-ray energy ranges can be achieved using high efficiency and high energy resolution multilayer coatings, and the materials, thicknesses, and other parameters of the multilayer coatings in accordance with certain embodiments described herein are clear in view of the information provided herein.

In certain embodiments, the x-ray spectrometer 100 is a component of an x-ray analysis system comprising an excitation source of radiation and/or particles (e.g., an x-ray source configured to emit x-rays; an electron source configured to emit electrons; a laboratory excitation source) that illuminate a sample (e.g., object being analyzed). In certain embodiments, the excitation source comprises an optical system (e.g., additional x-ray optics; electron optics) placed between the excitation source and the sample to direct and/or focus the radiation and/or particles onto the sample. The sample is configured to emit x-rays (e.g., fluorescence x-rays) in response to the excitation, and the emitted x-rays are received, detected, and analyzed by the x-ray spectrometer 100. In certain embodiments, the x-ray spectrometer 100 is in operational communication with a scanning electron microscope (SEM) (e.g., as an attachment to the SEM) and is configured to receive x-rays emitted from a sample in the SEM (e.g., x-rays generated due to the electron bombardment of the sample in the SEM). In certain such embodiments, the x-ray spectrometer 100 is configured to provide energy discrimination (e.g., by resolving or separating) soft energy x-ray fluorescence characteristic lines of different elements, which can be close to or overlap one another.

In certain embodiments, the x-ray analysis system is further configured to calibrate the x-ray energy for each pixel of the pixel array (e.g., by receiving the x-rays emitted by an x-ray source having a known x-ray spectrum). For example, the x-ray spectrometer 100 can be configured to receive the x-rays 10 emitted from the x-ray source and to direct at least some of the received x-rays towards the at least one x-ray detector 130.

It is to be appreciated that the embodiments disclosed herein are not mutually exclusive and may be combined with one another in various arrangements.

The invention described and claimed herein is not to be limited in scope by the specific example embodiments herein disclosed, since these embodiments are intended as illustrations, and not limitations, of several aspects of the invention. Any equivalent embodiments are intended to be within the scope of this invention. Indeed, various modifications of the invention in form and detail, in addition to those shown and described herein, will become apparent to those skilled in the art from the foregoing description. The breadth and scope of the invention should not be limited by any of the example embodiments disclosed herein.

What is claimed is:

1. An x-ray spectrometer comprising:
   at least one x-ray optic configured to receive x-rays having an incident intensity distribution as a function of x-ray energy, the at least one x-ray optic comprising:
   at least one substrate comprising at least one surface having a shape of at least a portion of an inner surface of a tube symmetric about and extending along a longitudinal axis, the inner surface extending around the longitudinal axis and having a diameter in a plane perpendicular to the longitudinal axis, the diameter varying as a function of position along the longitudinal axis, the at least one surface extending around the longitudinal axis by an angle of at least 45 degrees; and
   at least one mosaic crystal structure and/or a plurality of layers on or over at least a portion of the at least one surface, the plurality of layers comprising a first plurality of first layers comprising a first material and a second plurality of second layers comprising a second material, the first layers and the second layers alternating with one another in a direction perpendicular to the at least one surface; and
   at least one x-ray detector configured to receive x-rays from the at least one x-ray optic and to record a spatial distribution of the x-rays from the at least one x-ray optic.

2. The x-ray spectrometer of claim 1, wherein a first portion of the at least one x-ray optic is configured to direct a first portion of the received x-rays towards the at least one x-ray detector, a second portion of the at least one x-ray optic is configured to direct a second portion of the received x-rays towards the at least one x-ray detector, the second portion of the at least one x-ray optic displaced from the first portion of the at least one x-ray optic along a direction parallel to the longitudinal axis, the directed first portion of the received x-rays having a first intensity distribution as a function of x-ray energy, the directed second portion of the received x-rays having a second intensity distribution as a function of x-ray energy, the second intensity distribution different from the first intensity distribution.

3. The x-ray spectrometer of claim 2, wherein the received x-rays are propagating along at least one direction having a non-zero component parallel to the longitudinal axis, the first portion of the received x-rays impinging the first portion of the at least one x-ray optic at a first grazing incidence angle, the second portion of the received x-rays impinging the second portion of the at least one x-ray optic at a second grazing incidence angle different from the first grazing incidence angle.

4. The x-ray spectrometer of claim 2, wherein the directed first portion of the received x-rays propagate to a first portion of the at least one x-ray detector and the directed second portion of the received x-rays propagate to a second portion of the at least one x-ray detector, the second portion of the at least one x-ray detector spatially displaced from the first portion of the at least one x-ray detector.

5. The x-ray spectrometer of claim 1, wherein the at least one x-ray optic is configured to direct x-rays within different x-ray energy ranges onto corresponding different regions of the at least one x-ray detector such that spatial positions of the different regions correspond to x-rays within the different x-ray energy ranges.

6. The x-ray spectrometer of claim 1, wherein the at least one surface of the at least one x-ray optic extends around the longitudinal axis by an angle in a range of 45 degrees to 315 degrees.

7. An x-ray spectrometer comprising:
   at least one x-ray optic configured to receive x-rays having an incident intensity distribution as a function of x-ray energy, the at least one x-ray optic comprising:
   at least one substrate comprising at least one surface extending at least partially around and along a longitudinal axis, a distance between the at least one surface and the longitudinal axis in at least one cross-sectional plane parallel to the longitudinal axis varying as a function of position along the longitudinal axis, wherein the at least one surface has a length parallel to the longitudinal axis in a range of 3 mm to 150 mm, a width perpendicular to the length in a range of 1 mm to 50 mm, an inner diameter in a range of 1 mm to 50 mm in a plane perpendicular to the longitudinal axis, a surface roughness in a range of 0.1 nm to 1 nm, and/or a plurality of surface tangent planes having a range of angles relative to the longitudinal axis in a range of 0.01 radian to 0.4 radian; and
   at least one mosaic crystal structure and/or a plurality of layers on or over at least a portion of the at least one surface, the plurality of layers comprising a first plurality of first layers comprising a first material and a second plurality of second layers comprising a second material, the first layers and the second layers alternating with one another in a direction perpendicular to the at least one surface; and
   at least one x-ray detector configured to receive x-rays from the at least one x-ray optic and to record a spatial distribution of the x-rays from the at least one x-ray optic.

8. The x-ray spectrometer of claim 1, wherein at least a portion of the at least one surface is concave and is curved in at least one cross-sectional plane parallel to the longitudinal axis, at least a portion of the surface having a quadric profile in the cross-sectional plane.

9. The x-ray spectrometer of claim 8, wherein the quadric profile is selected from the group consisting of: at least one ellipsoid; at least one paraboloid; at least one hyperboloid; or a combination of two or more thereof.

10. The x-ray spectrometer of claim 1, wherein each layer of the plurality of layers has a thickness in a range of 0.3 nm to 9 nm.

11. The x-ray spectrometer of claim 1, wherein the first layers and the second layers alternate with one another with a periodicity that does not change throughout the plurality of layers.

12. The x-ray spectrometer of claim 1, wherein the first material of the plurality of layers comprises at least one of: silicon, boron, and carbon, and the second material of the plurality of layers comprises at least one of: chromium, molybdenum, and platinum.

13. The x-ray spectrometer of claim 1, wherein the at least one x-ray detector comprises a pixel array x-ray detector.

14. The x-ray spectrometer of claim 13, wherein the pixel array x-ray detector comprises a pixel array extending along one dimension.

15. The x-ray spectrometer of claim 13, wherein the pixel array x-ray detector comprises a pixel array extending along two orthogonal dimensions.

16. The x-ray spectrometer of claim 13, wherein the pixel array x-ray detector comprises at least one of: a direct detection charge-coupled device (CCD) detector; a complementary metal-oxide-semiconductor (CMOS) detector; an energy-resolving x-ray detector; an indirect conversion detector comprising an x-ray scintillator; a photon-counting detector.

17. The x-ray spectrometer of claim 13, wherein the pixel array x-ray detector comprises pixels having widths in a range from 1 micron to 200 microns.

18. The x-ray spectrometer of claim 1, further comprising at least one beam stop configured to stop x-rays that are propagating along the longitudinal axis but that do not irradiate the at least one x-ray optic from reaching the at least one x-ray detector.

19. The x-ray spectrometer of claim 1, wherein the at least one mosaic crystal structure comprises one or more mosaic graphite crystal structures selected from the group consisting of: highly oriented pyrolytic graphite; highly annealed pyrolytic graphite; a combination thereof.

20. An x-ray spectrometer comprising:
a multilayer stack configured to receive x-rays having an incident intensity distribution as a function of x-ray energy, the multilayer stack comprising a first plurality of first layers comprising a first material and a second plurality of second layers comprising a second material, the first layers and the second layers alternating with one another, a first portion of the multilayer stack configured to direct a first portion of the received x-rays, a second portion of the multilayer stack configured to direct a second portion of the received x-rays, the second portion of the multilayer stack laterally displaced from the first portion of the multilayer stack, the directed first portion of the received x-rays having a first intensity distribution as a function of x-ray energy, the directed second portion of the received x-rays having a second intensity distribution as a function of x-ray energy, the second intensity distribution different from the first intensity distribution, the multilayer stack on at least one surface having a shape of at least a portion of an inner surface of a tube symmetric about and extending along a longitudinal axis, the inner surface extending around the longitudinal axis and having a diameter in a plane perpendicular to the longitudinal axis, the diameter varying as a function of position along the longitudinal axis, the at least one surface extending around the longitudinal axis by an angle of at least 45 degrees; and
at least one x-ray detector configured to receive the directed first portion and the directed second portion of the received x-rays from the at least one x-ray optic and to record a spatial distribution of the directed first portion and the directed second portion of the received x-rays from the multilayer stack.

21. An x-ray spectrometer comprising:
at least one x-ray optic configured to receive x-rays having a spectral bandwidth greater than 100 eV, the at least one x-ray optic comprising at least one surface having a shape of at least a portion of an inner surface of a tube symmetric about and extending along the longitudinal axis, the inner surface extending around the longitudinal axis and having a diameter in a plane perpendicular to the longitudinal axis, the diameter varying as a function of position along the longitudinal axis, the at least one surface extending around the longitudinal axis by an angle of at least 45 degrees, the at least one x-ray optic comprising a plurality of layers on or over at least a portion of the at least one surface, the at least one x-ray optic configured to diffract and cause spatial separation of the received x-rays as a function of x-ray energy for at least a portion of the spectral bandwidth of the received x-rays according to the Bragg relation; and
at least one x-ray detector configured to record a spatial distribution of at least some of the x-rays diffracted by the at least one x-ray optic.

22. The x-ray spectrometer of claim 21, wherein the at least one surface comprises a concave surface curved in a plane parallel to the longitudinal axis.

23. The x-ray spectrometer of claim 22, wherein a curvature of the concave surface, spacings among the plurality of layers, a distance between the at least one x-ray optic and the at least one x-ray detector, and/or a spatial resolution of the at least one x-ray detector are configured to provide an energy resolution of less than 50 eV.

24. The x-ray spectrometer of claim 21, wherein the at least one surface extends around the longitudinal axis by an angle in a range of 45 degrees to 315 degrees.

25. The x-ray spectrometer of claim 21, wherein at least a portion of the at least one surface has a substantially straight cross-sectional profile in a plane parallel to and that comprises the longitudinal axis.

26. The x-ray spectrometer of claim 21, wherein the plurality of layers comprises a first plurality of first layers comprising a first material and a second plurality of second layers comprising a second material, the first layers and the second layers alternating with one another.

27. The x-ray spectrometer of claim 26, wherein the first layers and the second layers alternate with one another with a periodicity that does not change throughout the plurality of layers.

28. The x-ray spectrometer of claim 21, wherein the plurality of layers comprises a mosaic crystal structure selected from the group consisting of: highly oriented pyrolytic graphite; highly annealed pyrolytic graphite; a combination thereof.

* * * * *

UNITED STATES PATENT AND TRADEMARK OFFICE
CERTIFICATE OF CORRECTION

PATENT NO. : 10,989,822 B2
APPLICATION NO. : 16/427148
DATED : April 27, 2021
INVENTOR(S) : Wenbing Yun Page 1 of 1

It is certified that error appears in the above-identified patent and that said Letters Patent is hereby corrected as shown below:

In the Specification

In Column 8, Line 60, delete "A" and insert --$\lambda$--.

In Column 8, Lines 53-54, delete "($2d \sin \theta = n\lambda = nhc|E$)" and insert --($2d \sin \theta = n\lambda = nhc/E$)--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*